United States Patent
Austrheim

(10) Patent No.: US 12,122,649 B2
(45) Date of Patent: Oct. 22, 2024

(54) CONTAINER-HANDLING VEHICLE

(71) Applicant: Autostore Technology AS, Nedre Vats (NO)

(72) Inventor: Trond Austrheim, Etne (NO)

(73) Assignee: AutoStore Technology AS, Nedre Vats (NO)

(*) Notice: Subject to any disclaimer, the term of this patent is extended or adjusted under 35 U.S.C. 154(b) by 848 days.

(21) Appl. No.: 17/045,404

(22) PCT Filed: Oct. 11, 2018

(86) PCT No.: PCT/EP2018/077687
§ 371 (c)(1),
(2) Date: Oct. 5, 2020

(87) PCT Pub. No.: WO2019/206437
PCT Pub. Date: Oct. 31, 2019

(65) Prior Publication Data
US 2021/0147201 A1   May 20, 2021

(30) Foreign Application Priority Data

Apr. 25, 2018 (NO) .................................... 20180589

(51) Int. Cl.
  *B65G 1/04*   (2006.01)
  *B65G 35/06*  (2006.01)
  *B66F 7/02*   (2006.01)
(52) U.S. Cl.
  CPC .............. *B66F 7/02* (2013.01); *B65G 1/0464* (2013.01); *B65G 35/06* (2013.01)
(58) Field of Classification Search
  CPC ....... B66F 7/02; B65G 1/0492; B65G 1/0478; B65G 1/0457
  See application file for complete search history.

(56) References Cited

U.S. PATENT DOCUMENTS 3,051,321 A     8/1962  Ramsden
10,703,564 B2 *  7/2020  Hognaland .......... B65G 1/0464
(Continued)

FOREIGN PATENT DOCUMENTS

AT    358771 B      9/1980
CN    201343372 Y   11/2009
(Continued)

OTHER PUBLICATIONS

Office Action issued in Chinese Application No. 201880092698.0 dated Sep. 1, 2021 (11 pages).
(Continued)

*Primary Examiner* — Kaitlin S Joerger
(74) *Attorney, Agent, or Firm* — Baker Botts L.L.P.

(57) ABSTRACT

A container-handling vehicle for picking up storage containers from a three-dimensional grid of an underlying storage system includes a vehicle body and at least one lifting device. The lifting device includes a lifting shaft assembly including a lifting shaft and at least one motor for rotating the lifting shaft, a lifting frame for releasably connecting a storage container, and a first pair of lifting bands and a second pair of lifting bands connecting the lifting shaft to the lifting frame. The lifting shaft includes a first end section and a second end section. Each lifting band has a first end and a second end connected to the lifting shaft and a corresponding lifting band connector on the lifting frame, respectively. Each pair of lifting bands has a first lifting band connected at the first end section of the lifting shaft and a second lifting band connected at the second end section of the lifting shaft. The first pair of lifting bands extends in a substantially horizontal direction from the lifting shaft towards a band guiding assembly, the band guiding assembly is arranged to change the direction of the first pair of lifting bands to extend in a vertical direction. The
(Continued)

second pair of lifting bands extends in a vertical direction from the lifting shaft at the side of the lifting shaft facing away from the band guiding assembly, and the connections between the first ends of the first pair of lifting bands and the lifting shaft is staggered by 75-105 degrees relative the connections between the first ends of the second pair of lifting bands and the lifting shaft.

12 Claims, 26 Drawing Sheets

(56) References Cited

U.S. PATENT DOCUMENTS

| | | | |
|---|---|---|---|
| 11,434,075 | B2* | 9/2022 | Austrheim ........... B65G 1/0492 |
| 2004/0101393 | A1 | 5/2004 | Lopez Alba |
| 2005/0077112 | A1* | 4/2005 | Ehrenleitner ............ B66F 7/02 187/261 |
| 2011/0130121 | A1 | 6/2011 | Patel et al. |
| 2017/0152111 | A1 | 6/2017 | Kinugawa et al. |
| 2019/0229003 | A1* | 7/2019 | Kesil ................ H01L 21/67712 |
| 2020/0346906 | A1* | 11/2020 | Mohr ....................... B66C 13/06 |
| 2021/0017004 | A1* | 1/2021 | Jang ......................... B66D 3/04 |
| 2021/0139239 | A1* | 5/2021 | Austrheim ........... B65G 1/0464 |
| 2021/0147201 | A1* | 5/2021 | Austrheim ............. B65G 35/06 |

FOREIGN PATENT DOCUMENTS

| | | |
|---|---|---|
| CN | 101818580 A | 9/2010 |
| CN | 102460675 A | 5/2012 |
| CN | 102976027 A | 3/2013 |
| CN | 202967859 U | 6/2013 |
| CN | 103950672 A | 7/2014 |
| CN | 108473252 A | 8/2018 |
| JP | 864-24090 U | 2/1989 |
| JP | H02-11455 A | 1/1990 |
| JP | H0610275 U | 2/1994 |
| JP | H08-38268 A | 2/1996 |
| JP | H09110114 A | 4/1997 |
| JP | 2000281278 A | 10/2000 |
| KR | 20060064298 A | 6/2006 |
| KR | 100643381 B1 | 11/2006 |
| NO | 317366 B1 | 10/2004 |
| WO | 2014/090684 A1 | 6/2014 |
| WO | 2015/193278 A1 | 12/2015 |
| WO | 2017/129384 A1 | 8/2017 |
| WO | 2017153583 A1 | 9/2017 |
| WO | 2018/060527 A1 | 4/2018 |
| WO | 2018/073392 A1 | 4/2018 |

OTHER PUBLICATIONS

International Search Report issued in Application No. PCT/EP2018/077687, dated Jan. 21, 2019 (16 pages).
Written Opinion issued in International Application No. PCT/EP2018/077687, dated Jan. 19, 2020 (13 pages).
International Preliminary Report on Patentability issued in Application No. PCT/EP2018/077687, dated Aug. 3, 2020 (19 pages).
Search Report issued in Norwegian Application No. 20180589, dated Nov. 23, 2018 (2 pages).
Extended European Search Report issued in European Application No. 23196540.1, dated Dec. 18, 2023 (12 pages).

* cited by examiner (Detail B)

(Section C-C)

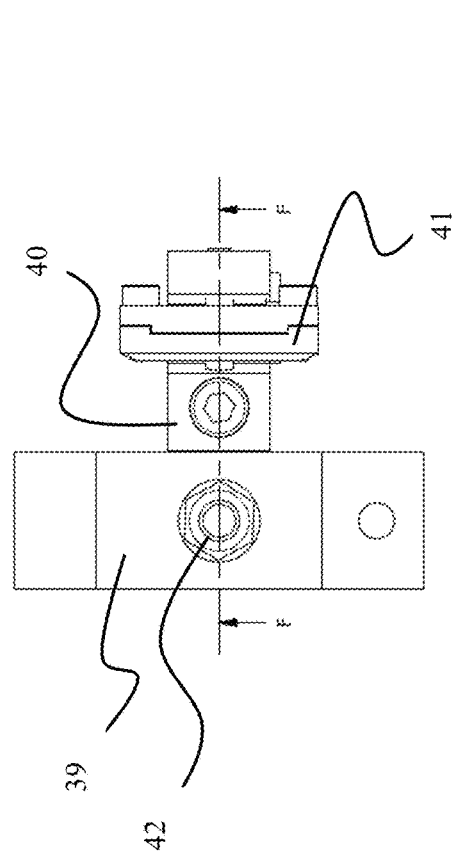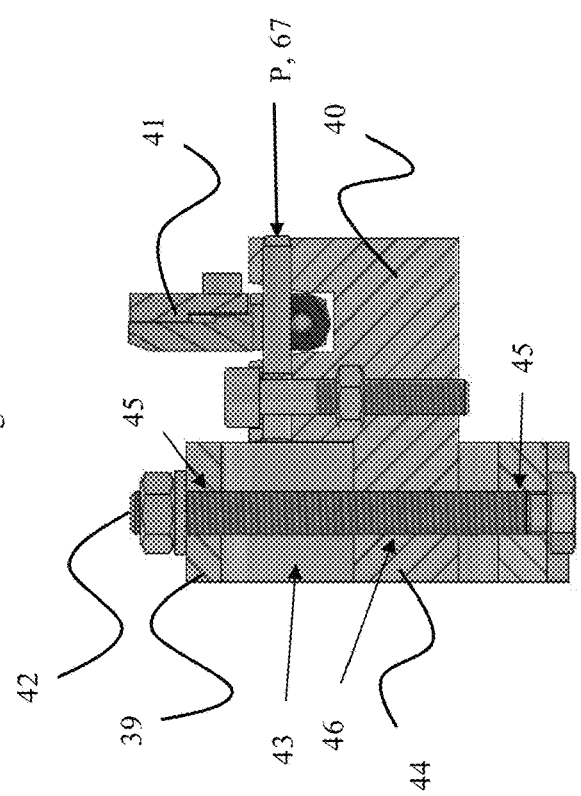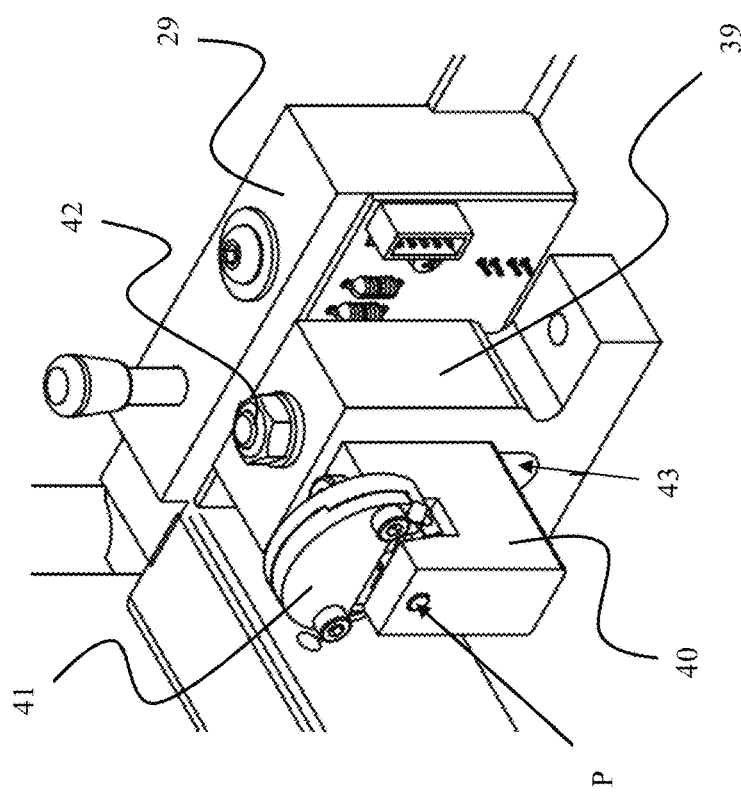

Fig. 13 (Section A-A)

Fig. 15 (Section A-A)

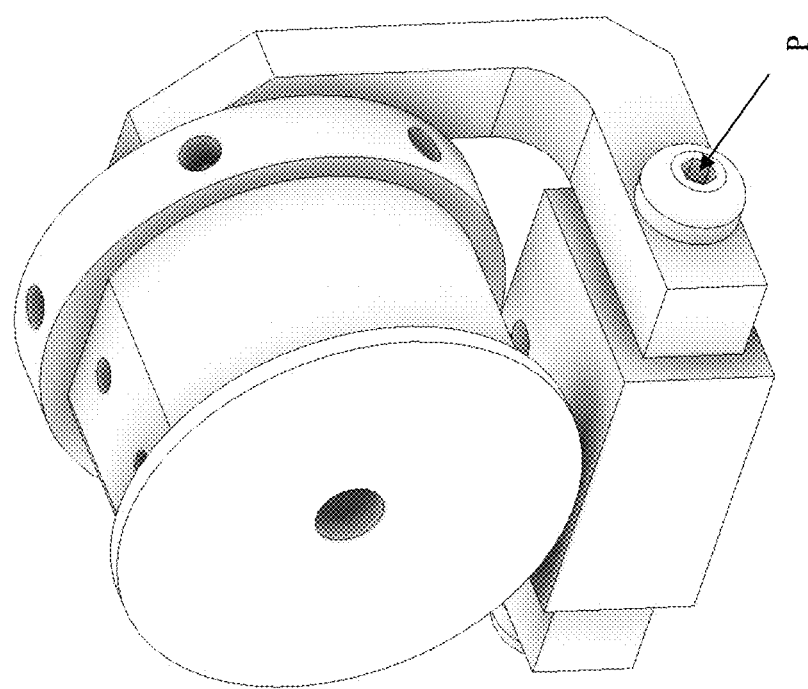
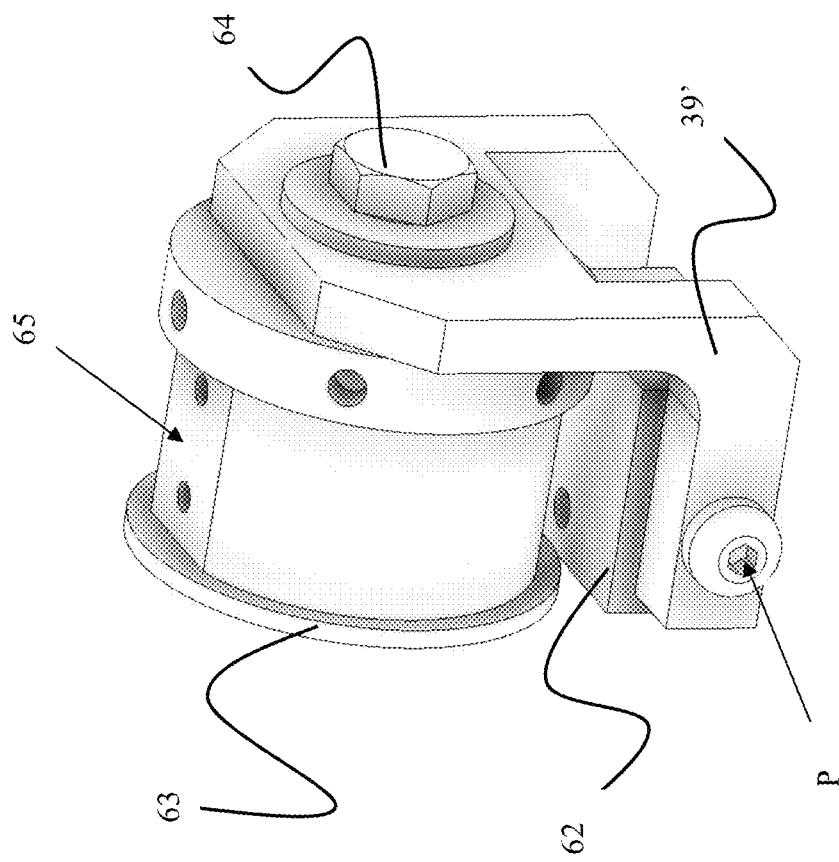
Fig. 22

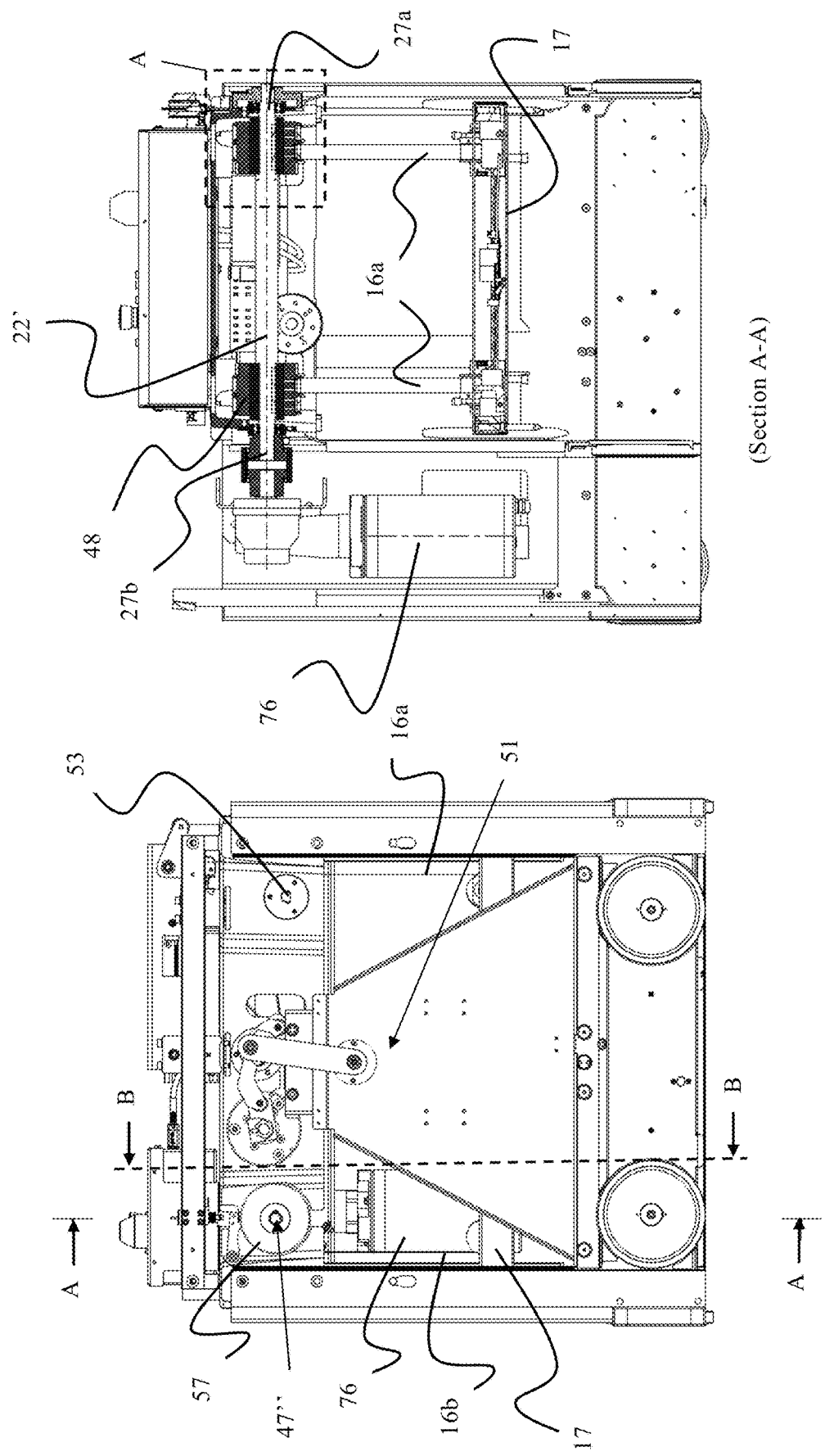

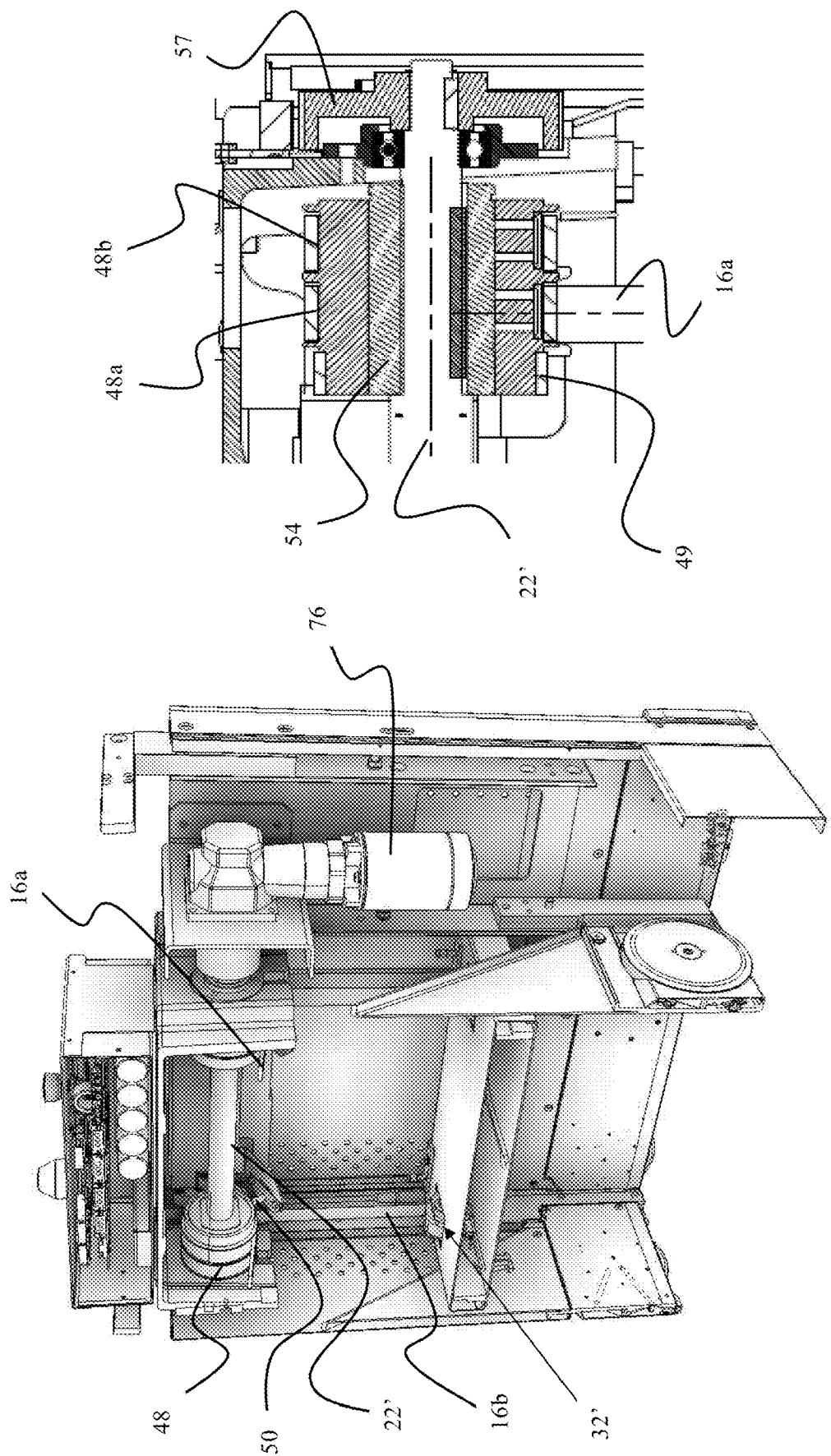
Fig. 26 (Detail A)
Fig. 25 (Section B-B)

CONTAINER-HANDLING VEHICLE

TECHNICAL FIELD

The present invention relates to a container handling vehicle and an automated storage and retrieval system comprising the container handling vehicle.

BACKGROUND AND PRIOR ART

Storage systems comprising a three-dimensional storage grid structure, within which storage containers/bins are stacked on top of each other, are well known.

FIG. 1 discloses a framework structure of a typical prior art automated storage and retrieval system 1 and FIGS. 2a and 2b disclose known container-handling vehicles of such a system. The storage system is disclosed in detail in for instance NO317366 and WO 2014/090684 A1.

The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid columns 12 arranged in rows. A majority of the grid columns 12 are storage columns 5 in which storage containers 6, also known as containers, are stacked one on top of another to form stacks 7. Each storage container 6 (or container for short) may typically hold a plurality of product items (not shown), and the product items within a storage container 6 may be identical, or may be of different product types depending on the application. The framework structure guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the grid columns 12, on which rail system 8 a plurality of container-handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container-handling vehicles 9 in a first direction X across the top of the frame structure 1, and a second set of parallel rails 11 arranged perpendicular to the first set of rails 10 to guide movement of the container-handling vehicles 9 in a second direction Y, which is perpendicular to the first direction X, see FIG. 3. In this way, the rail system 8 defines an upper end of the storage columns 5, above which the container-handling vehicles 9 can move laterally above the storage columns 5, i.e. in a plane, which is parallel to the horizontal X-Y plane.

Each container-handling vehicle 9 comprises a vehicle body 13 and first and second sets of wheels 14, 15 which enable the lateral movement of the container-handling vehicle 9, i.e. the movement in the X and Y directions. In FIG. 2, two wheels in each set are visible. The first set of wheels 14 is arranged to engage with two adjacent rails of the first set 10 of rails, and the second set of wheels 15 arranged to engage with two adjacent rails of the second set 11 of rails. One of the set of wheels 14, 15 can be lifted and lowered, so that the first set of wheels 14 and/or the second set of wheels 15 can be engaged with their respective set of rails 10, 11 at any one time.

Each container-handling vehicle 9 also comprises a lifting device 18 (not shown in FIGS. 1 and 2a, but visible in FIG. 2b) for vertical transportation of storage containers 6, e.g. raising a storage container 6 from and lowering a storage container 6 into a storage column 5. The lifting device 18 comprises a lifting frame (not shown in FIG. 2a, but similar to the one shown in FIG. 2b labelled 17) which is adapted to engage a storage container 6, which lifting frame can be lowered from the vehicle body 12 so that the position of the lifting frame with respect to the vehicle body 12 can be adjusted in a third direction Z, which is orthogonal the first direction X and the second direction Y.

Conventionally, and for the purpose of this application, $Z=1$ identifies the uppermost layer of the grid 4, i.e. the layer immediately below the rail system 8 (in the present application, the rail system 8 is termed the top level of the grid), $Z=2$ is the second layer below the rail system 8, $Z=3$ is the third layer etc. In the embodiment disclosed in FIG. 1, $Z=8$ identifies the lowermost, bottom layer of the grid 4. Consequently, as an example and using the Cartesian coordinate system X, Y, Z indicated in FIG. 1, the storage container identified as 6' in FIG. 1 can be said to occupy grid location or cell $X=10$, $Y=2$, $Z=3$. The container-handling vehicles 9 can be said to travel in layer $Z=0$ and each grid column 12 can be identified by its X and Y coordinates.

Each container-handling vehicle 9 comprises a storage compartment or space for receiving and stowing a storage container 6 when transporting the storage container 6 across the grid 4. The storage space may comprise a cavity 21 arranged centrally within the vehicle body 13, e.g. as is described in WO2014/090684A1, the contents of which are incorporated herein by reference.

Alternatively, the container-handling vehicles may have a cantilever construction, as is described in NO317366, the contents of which are also incorporated herein by reference.

The container-handling vehicles 9 may have a footprint F, i.e. a horizontal periphery in the X and Y directions (see FIG. 4), which is generally equal to the lateral or horizontal extent of a grid column 12, i.e. the periphery/circumference of a grid column 12 in the X and Y directions, e.g. as described in WO2015/193278A1, the contents of which are incorporated herein by reference. Alternatively, the container-handling vehicles 9 may have a footprint which is larger than the lateral extent of a grid column 12, e.g. a footprint approximately twice the lateral extent as disclosed in WO2014/090684A1.

The rail system 8 may be a single-track system, as shown in FIG. 3. Preferably, the rail system 8 is a double-track system, as shown in FIG. 4, thus allowing a container-handling vehicle 9 having a footprint F generally corresponding to the lateral extent of a grid column 12 to travel along a row of grid columns in either an X or Y direction even if another container-handling vehicle 9 is positioned above a grid column 12 adjacent to that row.

In a storage grid, a majority of the grid columns 12 are storage columns 5, i.e. grid columns where storage containers are stored in stacks. However, a grid normally has at least one grid column 12 which is used not for storing storage containers, but which comprises a location where the container-handling vehicles can drop off and/or pick up storage containers so that they can be transported to an access station where the storage containers 6 can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

For monitoring and controlling the automated storage and retrieval system, e.g. monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system comprises a control system, which typically is computerised and comprises a database for keeping track of the storage containers.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column 5 in which the target storage container is positioned, retrieving the storage container 6 from the storage column 5 using the container-handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands 16 extending in a vertical direction and connected close to the corners of a lifting frame 17 (may also be termed a gripping device) for releasable connection to a storage container. The lifting frame 17 features container connecting elements 24 for releasably connecting to a storage container, and guiding pins 30.

To raise or lower the lifting frame 17 (and optionally a connected storage container 6), the lifting bands 16 are connected to a band drive assembly. In the band drive assembly, the lifting bands 16 are commonly spooled on/off at least two rotating lifting shafts or reels (not shown) arranged in the container-handling vehicle, wherein the lifting shafts are further connected via belts/chains to at least one common rotor shaft providing synchronized rotational movement to the at least two lifting shafts. Various designs of lifting shafts are described in for instance WO2015/193278 A1 and WO2017/129384.

To obtain a correct length of all the lifting bands 16 relative the lifting frame, i.e. such that the lifting frame 17 is kept horizontal during operation, the length of the lifting bands must be adjusted both initially, as well as at various service intervals, since they tend to elongate slightly during use. In the prior art lifting devices, the lifting bands are commonly connected and spooled onto separate reels arranged at an upper level within the container-handling vehicle 9. To adjust a lifting band, the corresponding reel may be disconnected from a rotational shaft and the lifting band adjusted by free rotation of the reel relative the rotational shaft. The reel is subsequently fastened to the rotational shaft when the lifting band has the desired length.

To obtain access to the separate reels, a service person is required to remove at least some of the bodywork covering the vehicle body 13 or enter the cramped interior of the vehicle.

Most prior art container-handling vehicles having a central cavity for receiving a storage bin, as in FIG. 2a, features a lifting device 18 having a lifting band drive assembly comprising at least one rotor shaft, centrally arranged in an upper section of the vehicle and connected to a lifting motor. In addition to the centrally arranged rotor shaft, such lifting devices comprise an assembly of secondary shafts and/or sheaves onto which the lifting bands are spooled on and off. The secondary shafts and/or sheaves are rotated by being connected to the centrally arranged rotor shaft via belts/chains, and are arranged at the corners of the central cavity to provide the required positioning of the lifting bands 16 relative the lifting frame 17. Having such an assembly of multiple movable parts is not an optimal solution since the lifting devices are relatively service intensive, noisy and occupies a large volume inside the robot.

A container-handling vehicle featuring a centrally arranged rotatable lifting shaft, onto which the lifting bands are spooled, is disclosed in WO2017/129384 A1.

In view of the above, it is desirable to provide a container-handling vehicle, and an automated storage and retrieval system comprising said container-handling vehicle, wherein the disadvantages of the prior art lifting devices are avoided or at least mitigated.

SUMMARY OF THE INVENTION

The present invention is defined by the attached claims and in the following:

In a first aspect, the present invention provides a container-handling vehicle for picking up storage containers from a three-dimensional grid of an underlying storage system, comprising a vehicle body and at least one lifting device, wherein the lifting device comprises a lifting shaft assembly comprising a lifting shaft and at least one motor for rotating the lifting shaft, a lifting frame for releasably connecting a storage container, and a first pair of lifting bands and a second pair of lifting bands connecting the lifting shaft to the lifting frame, wherein
the lifting shaft comprises a first end section and a second end section;
each lifting band has a first end and a second end connected to the lifting shaft and a corresponding lifting band connector on the lifting frame, respectively;
each pair of lifting bands has a first lifting band connected at the first end section of the lifting shaft and a second lifting band connected at the second end section of the lifting shaft;
the first pair of lifting bands extends in a substantially horizontal direction from the lifting shaft towards a band guiding assembly, the band guiding assembly is arranged to change the direction of the first pair of lifting bands to extend in a vertical direction; and wherein
the second pair of lifting bands extends in a vertical direction from the lifting shaft.

The first aspect may alternatively be defined as a container-handling vehicle for picking up storage containers from a three-dimensional grid of an underlying storage system, comprising a vehicle body and at least one lifting device, wherein the lifting device comprises a lifting band drive assembly, comprising a lifting shaft assembly and a band guiding assembly, a lifting frame for releasably connecting a storage container, and a first pair of lifting bands and a second pair of lifting bands connecting the lifting shaft to the lifting frame, the lifting band assembly comprises a lifting shaft and at least one motor for rotating the lifting shaft, wherein > the lifting shaft comprises a first end section and a second end section;
> each lifting band has a first end and a second end connected to the lifting shaft and the lifting frame, respectively;
> each pair of lifting bands has a first lifting band connected at the first end section of the lifting shaft and a second lifting band connected at the second end section of the lifting shaft;
> the first pair of lifting bands extends in a substantially horizontal direction from the lifting shaft towards the band guiding assembly, the band guiding assembly is arranged to change the direction of the first pair of lifting bands to extend in a vertical direction; and wherein the second pair of lifting bands extends in a vertical direction from the lifting shaft.

When arranged in the vertical direction, i.e. extending vertically, the lifting bands are arranged at a horizontal distance from each other corresponding to the horizontal distance between corresponding band connecting elements on the lifting frame.

By having the second pair of lifting bands extending vertically from the lifting shaft, the lifting device will occupy a minimal space inside the robot since no additional lifting band guiding is required.

In an embodiment of the container-handling vehicle, the band guiding assembly and the lifting shaft are arranged such that each lifting band extends in a vertical direction at a horizontal position corresponding to the horizontal position of a corresponding lifting band connector on the lifting frame.

In an embodiment of the container-handling vehicle, the band guiding assembly comprises a sheave for each lifting band of the first pair of lifting bands. The sheaves are arranged such that each lifting band of the first pair of lifting bands extends in a vertical direction at a position directly above a corresponding lifting band connector on the lifting frame.

In an embodiment of the container-handling vehicle, the second pair of lifting bands extends in a vertical direction from the lifting shaft at the side of the lifting shaft facing away from the band guiding assembly.

In an embodiment of the container-handling vehicle the lifting frame comprises four corner sections and a lifting band connector connected to one of the lifting bands is arranged at each corner section, wherein the band guiding assembly and the lifting shaft is spaced such that each lifting band extends in a vertical direction at a horizontal position corresponding to the horizontal position of the lifting band connector to which it is connected.

In an embodiment of the container-handling vehicle, at least three of the lifting band connectors are adjustable, such that the level of the corresponding corner sections may be adjusted. Alternatively, such that the vertical distance between the corresponding corner sections and the lifting band drive assembly may be adjusted.

In an embodiment of the container-handling vehicle, the at least one motor is a brushless DC motor comprising a stator element and a rotor element, and the lifting shaft is connected to, or constitutes a part of, the rotor element.

In one embodiment of the container-handling vehicle, the at least one motor is arranged between the first and the second end section of the lifting shaft, or arranged at the first or the second end section of the lifting shaft. This provides a lifting shaft assembly not requiring any power transfer bands, and a minimum of parts.

In an embodiment of the container-handling vehicle, the connections between the first ends of the first pair of lifting bands and the lifting shaft is staggered/displaced by 75-105 degrees, preferably by about 90 degrees, relative the connections between the first ends of the second pair of lifting bands and the lifting shaft. The connections between the first ends of the first pair of lifting bands and the lifting shaft have the same radial position relative a centreline of the lifting shaft. The connections between the first ends of the second pair of lifting bands and the lifting shaft have the same radial position relative a centreline of the lifting shaft. The radial position of the connections between the first ends of the first pair of lifting bands and the lifting shaft is displaced/staggered by 75-105 degrees, preferably about 90 degrees, relative the radial position of the connections between the first ends of the second pair of lifting bands and the lifting shaft. The connections between the first ends of the lifting bands, i.e. the first ends of the four lifting bands constituting the first and second pair of lifting bands, and the lifting shaft are arranged at different axial positions relative the lifting shaft.

In an embodiment of the container-handling vehicle, the lifting shaft assembly comprises at least one electrical insulating element arranged such that the lifting bands connected at the first end section is electrically insulated from the lifting bands connected at the second end section, i.e. such that the lifting bands connected at the first end section may have an electric potential different from the lifting bands connected at the second end section.

By electrically insulating the lifting bands connected at the first end section from the lifting bands connected at the second end section, the lifting bands may for instance be used to control the releasable connection of the lifting frame to a storage container, while at the same time having the lifting bands connected to a common lifting shaft.

In an embodiment of the container-handling vehicle, a dual band reel is arranged at each of the first end section and the second end section, each dual band reel is connected to two separate lifting bands.

In an embodiment of the container-handling vehicle, each dual band reel comprises a first and a second reel section. Each reel section featuring a reel band connector for connection to a first end of a lifting band. The first reel sections connected to the first pair of lifting bands and the second reel sections connected to the second pair of lifting bands. In other words, each of the first reel sections is connected to one of the two lifting bands of the first pair of lifting bands, and each of the second reel sections is connected to one of the two lifting bands of the second pair of lifting bands. The reel band connectors of the first reel sections are staggered by 75-105 degrees, preferably about 90 degrees, relative the reel band connectors of the second reel sections. The reel band connectors of the first reel sections have the same radial position relative a centreline of the lifting shaft. The reel band connectors of the second reel sections have the same radial position relative a centreline of the lifting shaft. The radial position of the reel band connectors of the first reel sections are staggered by 75-105 degrees, preferably about 90 degrees, relative the radial position of the reel band connectors of the second reel sections.

In an embodiment of the container-handling vehicle, each of the dual band reels provides electrical contact between at least one of the lifting bands connected thereto and a control unit arranged in the container-handling vehicle, such that electrical signals and/power may be transferred from the control unit via the dual band reel to the at least one lifting band.

In an embodiment of the container-handling vehicle, each dual band reel comprises a slip ring for electrical signal transfer between a control unit arranged in the container-handling vehicle and the lifting bands via a conducting brush in contact with the slip ring.

At least an outer layer of the dual band reel and the slip ring is made in an electrically conducting material, such as an aluminium alloy. The dual band reel is preferably made as a single reel element comprising the slip ring. However, the dual band reel may also comprise two separate band reels and a slip ring provided the separate band reels and the slip ring are in electrical contact.

In an embodiment, the container-handling vehicle comprises wheels for moving the vehicle above or on top of the three-dimensional grid.

In an embodiment, the container-handling vehicle comprises
  a first set of wheels arranged at opposite sides of the vehicle body (or arranged at opposite sides of a cavity of the vehicle body), for moving the vehicle along a first direction on the grid;
  a second set of wheels arranged at opposite sides of the vehicle body, for moving the vehicle along a second direction on the grid, the second direction being perpendicular to the first direction; and
  the first set of wheels displaceable in a vertical direction between a first position, wherein the first set of wheels allow movement of the vehicle along the first direction, and a second position, wherein the second set of wheels allow movement of the vehicle along the second direction, wherein
the vehicle body surrounds a cavity, and the at least one lifting device is connected at a top section of the cavity to lift a storage container from the grid and into the cavity, such that a bottom of the storage container is at a level above the lowest level of the second set of wheels.

In an embodiment, the container-handling vehicle comprises at least two lifting devices. The at least two lifting devices may be adjacent.

In an embodiment, the container-handling vehicle comprises four lifting devices.

In an embodiment, the cavity is for accommodating at least two adjacent storage containers and at least two adjacent lifting devices.

In an embodiment of the container-handling vehicle, the cavity comprises a first vertical side section and a second vertical side section, the vertical side sections being parallel and arranged on opposite sides of the cavity, and wherein the lifting shaft is arranged adjacent and parallel to the first vertical side section and the first pair of lifting bands extends in a substantially horizontal direction from the lifting shaft towards the second vertical side section. In a container handling vehicle comprising a cavity for accommodating a single storage container, the band guiding assembly is preferably arranged close to the second vertical side section such that the first pair of lifting bands extends in a vertical direction close to the second vertical side section.

In a second aspect, the present invention provides a storage system comprising a three-dimensional grid and at least one container-handling vehicle according to any of the preceding claims, wherein the grid comprises multiple storage columns, in which storage containers may be stored on top of one another in vertical stacks, and the container handling vehicle is operated on rails at a top level of the grid for retrieving storage containers from, and storing storage containers in, the storage columns, and for transporting the storage containers horizontally across the grid.

In a third aspect, the present invention provides a method of raising or lowering a storage container relative a container-handling vehicle having a lifting device, the lifting device comprising a lifting shaft and at least one motor for rotating the lifting shaft, a lifting frame for releasably connecting the storage container, and a first pair of lifting bands and a second pair of lifting bands connecting the lifting shaft to the lifting frame, the method comprising the steps of:
  spooling the first pair of lifting bands on or off the lifting shaft, the first pair of lifting bands extending in a substantially horizontal direction from the lifting shaft; and simultaneously
  spooling the second pair of lifting bands on or off the lifting shaft, the second pair of lifting bands extending in a vertical direction from the lifting shaft,
such that a storage container connected to the lifting frame is raised or lowered relative the container-handling vehicle.

In an embodiment, the method comprises the step of guiding the first pair of lifting bands from the substantially horizontal direction to a vertical direction.

The term "lifting band drive assembly" is in the present invention intended to mean any assembly of at least one lifting shaft and any combination of reels, sheaves and/or motor(s) suitable for spooling and horizontal positioning of lifting bands, preferably four lifting bands, such that a lifting frame arranged below the lifting band assembly may be raised/lowered in the vertical direction while kept in a horizontal plane.

BRIEF DESCRIPTION OF THE DRAWINGS

Certain embodiments of the present invention will now be described in detail by way of example only and with reference to the following drawings:

FIG. 7b is an enlarged view of details shown in FIG. 7a.

FIGS. 9a-9c are perspective, top and cross-sectional views of an adjustable band connector of the lifting frame in FIG. 8.

FIG. 22 show two perspective side views of an adjustable lifting band connector of the lifting frame in FIG. 21.

FIG. 24 shows a side view and a cross-sectional view of an exemplary container-handling vehicle according to the invention.

FIG. 25 is a perspective cross-sectional view of the container-handling vehicle in FIG. 24.

FIG. 26 is an enlarged view of detail A shown in FIG. 24.

DETAILED DESCRIPTION OF THE INVENTION

Figure 1:
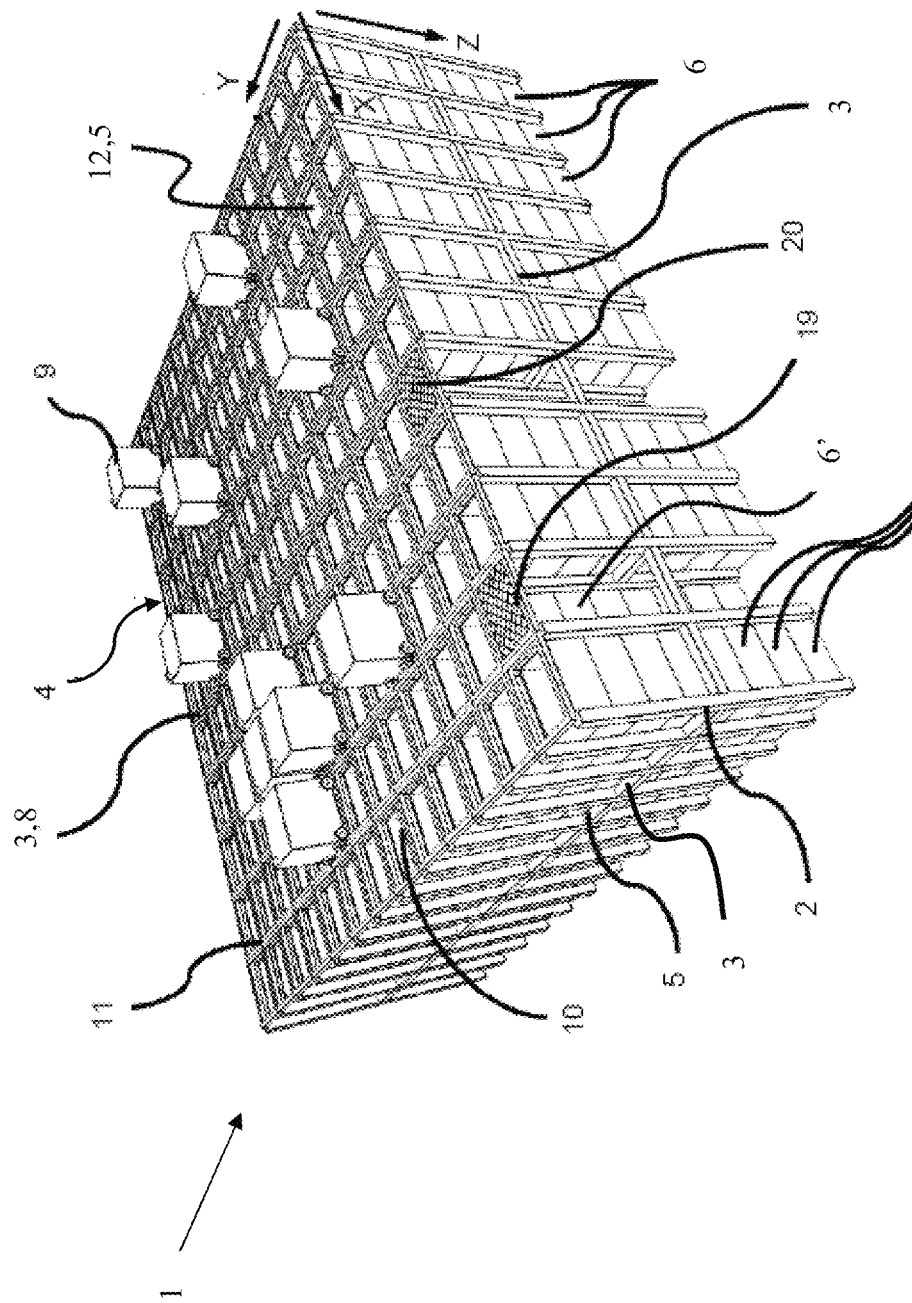
FIG. 1 is a perspective side view of a prior art storage and retrieval system.
Figure 2B:
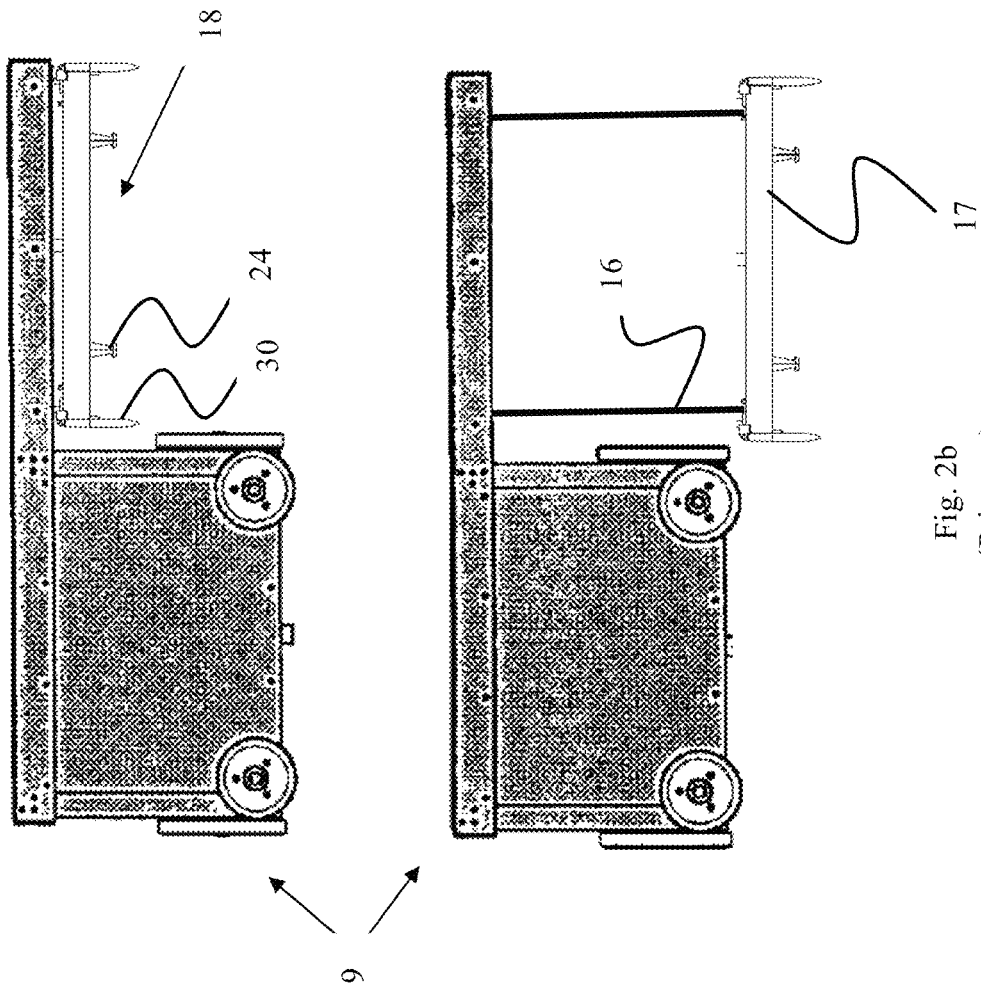
FIGS. 2a and 2b depict two different prior art container handling vehicles.
Figure 2A:
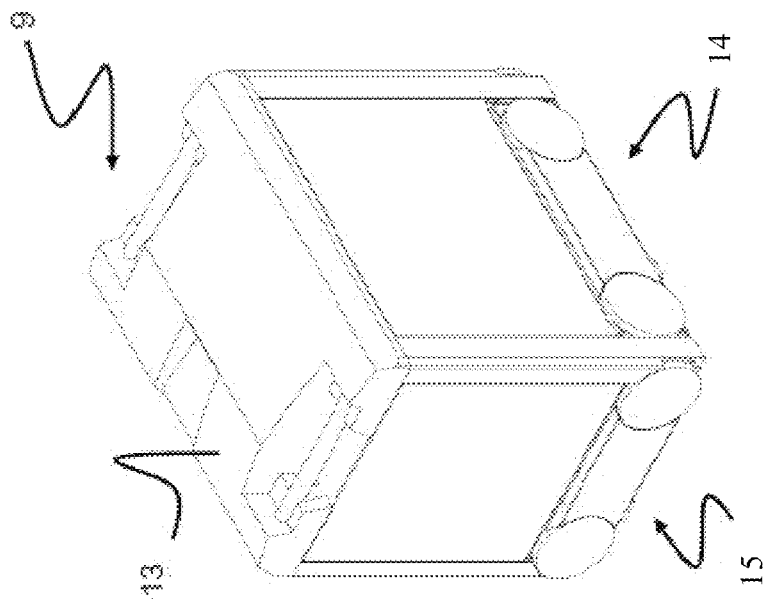
Figure 4:
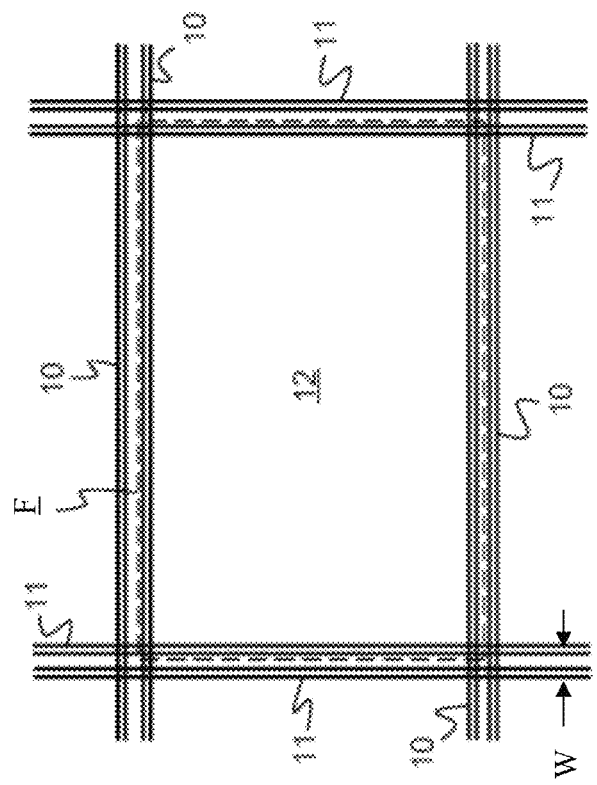
FIGS. 3 and 4 are top side schematic views of two types of rail systems for use in the storage system in FIG. 1.
Figure 3:
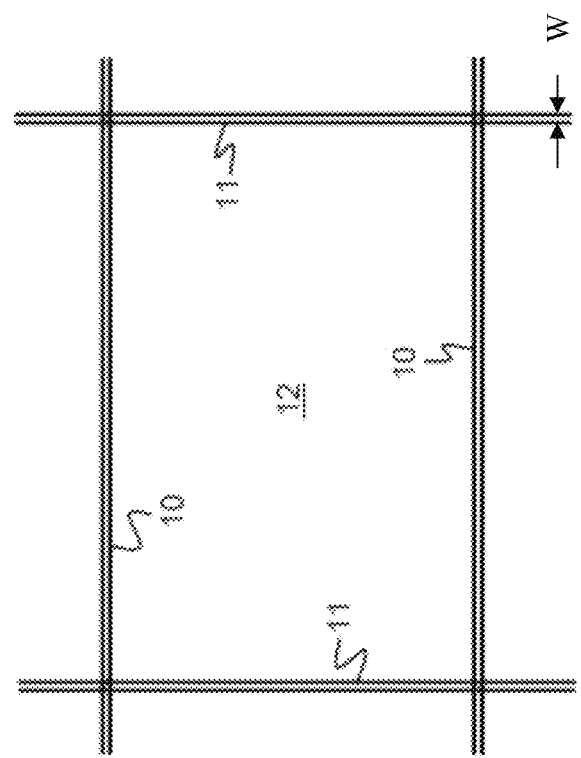

In the following, embodiments of the invention will be discussed in more detail by way of example only and with reference to the appended drawings. It should be understood, however, that the drawings are not intended to limit the invention to the subject-matter depicted in the drawings.

As mentioned above, a disadvantage of the prior art lifting devices 18 is the requirement of a lifting band drive assembly featuring a plurality of secondary shafts and/or sheaves, onto which the lifting bands 16 are spooled on and off, to provide the required positioning of the lifting bands relative the lifting frame. Further, to rotate the secondary shafts and/or sheaves they are connected to a rotor shaft via belts/chains.

Figure 5:
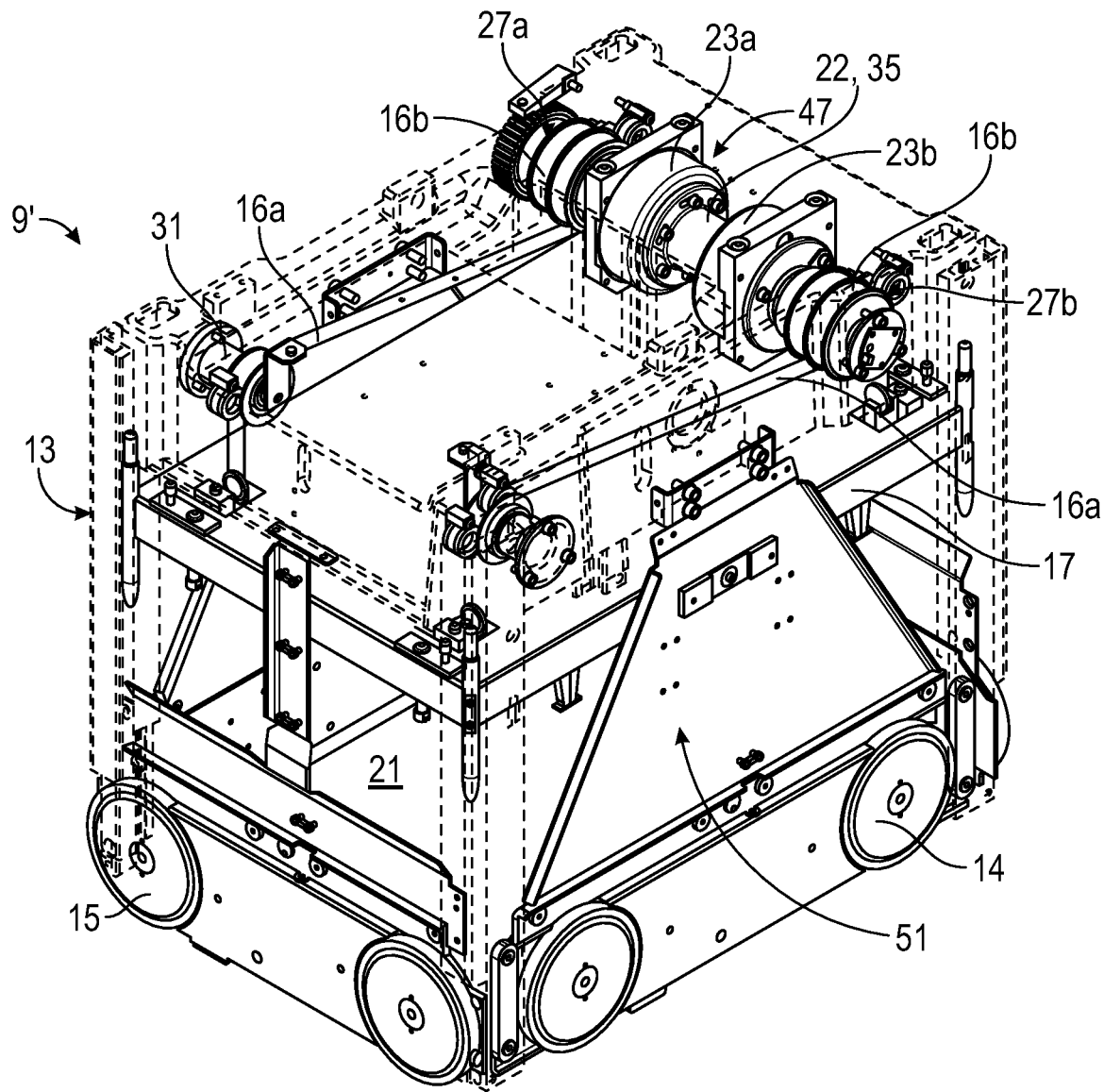
FIG. 5 is a perspective side view of an exemplary embodiment of a container-handling vehicle according to the invention.
Figure 6B:
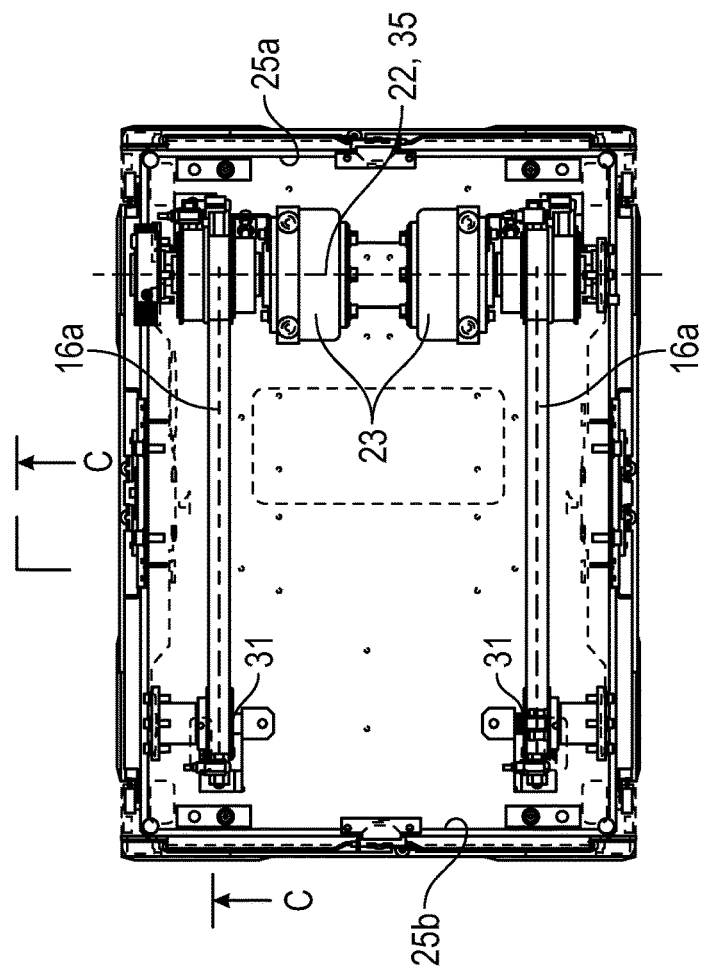
FIG. 6b is a top view of the container-handling vehicle in FIG. 5.
Figure 6A:
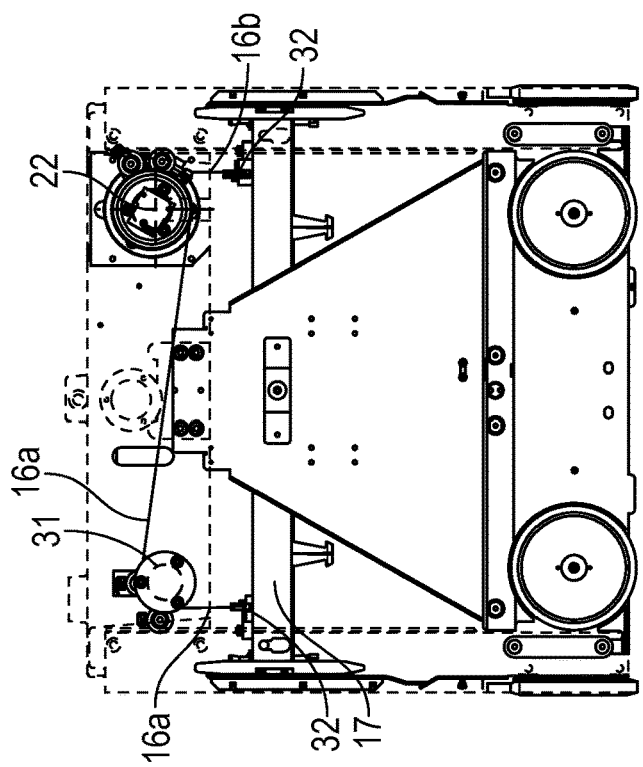
FIG. 6a is a side view of the container-handling vehicle in FIG. 5.

An exemplary embodiment of a container-handling vehicle 9' according to the invention is shown in FIGS. 5, 6a and 6b. The main differential feature of the vehicle 9' in view of the prior art vehicles 9, is the inventive lifting device 18'.

As described for the prior art vehicles 9, the container-handling vehicle 9' is suitable for picking up storage containers 6 from a three-dimensional grid 4 of an underlying storage system 1, see FIG. 1. The vehicle 9' features a first set of wheels 14 arranged at opposite sides of the vehicle body 13, for moving the vehicle 9' along a first direction X on the grid 4, and a second set of wheels 15 arranged at opposite sides of the vehicle body 13, for moving the vehicle 9' along a second direction Y on the grid 4, the second direction Y being perpendicular to the first direction X. The wheels are driven by a suitable wheel drive (not shown). Examples of suitable wheel drives are well known in the prior art disclosed above. By use of a wheel displacement assembly 51, the first set of wheels may be displaced in a vertical direction Z between a first position, wherein the first set of wheels 14 allow movement of the vehicle 9' along the first direction X, and a second position, wherein the second set of wheels 15 allow movement of the vehicle 9' along the second direction Y.

The vehicle body 13 surrounds a cavity 21 sized to accommodate a storage container 6 suitable for a storage system as described above. A lifting device 18' is connected at a top section of the cavity 21. The lifting device is arranged to lift/lower a storage container 6 from/to the grid 4. When the storage container is accommodated within the cavity 21, the bottom of the storage container is at a level above the lowest level of the second set of wheels 15.

Figure 10:
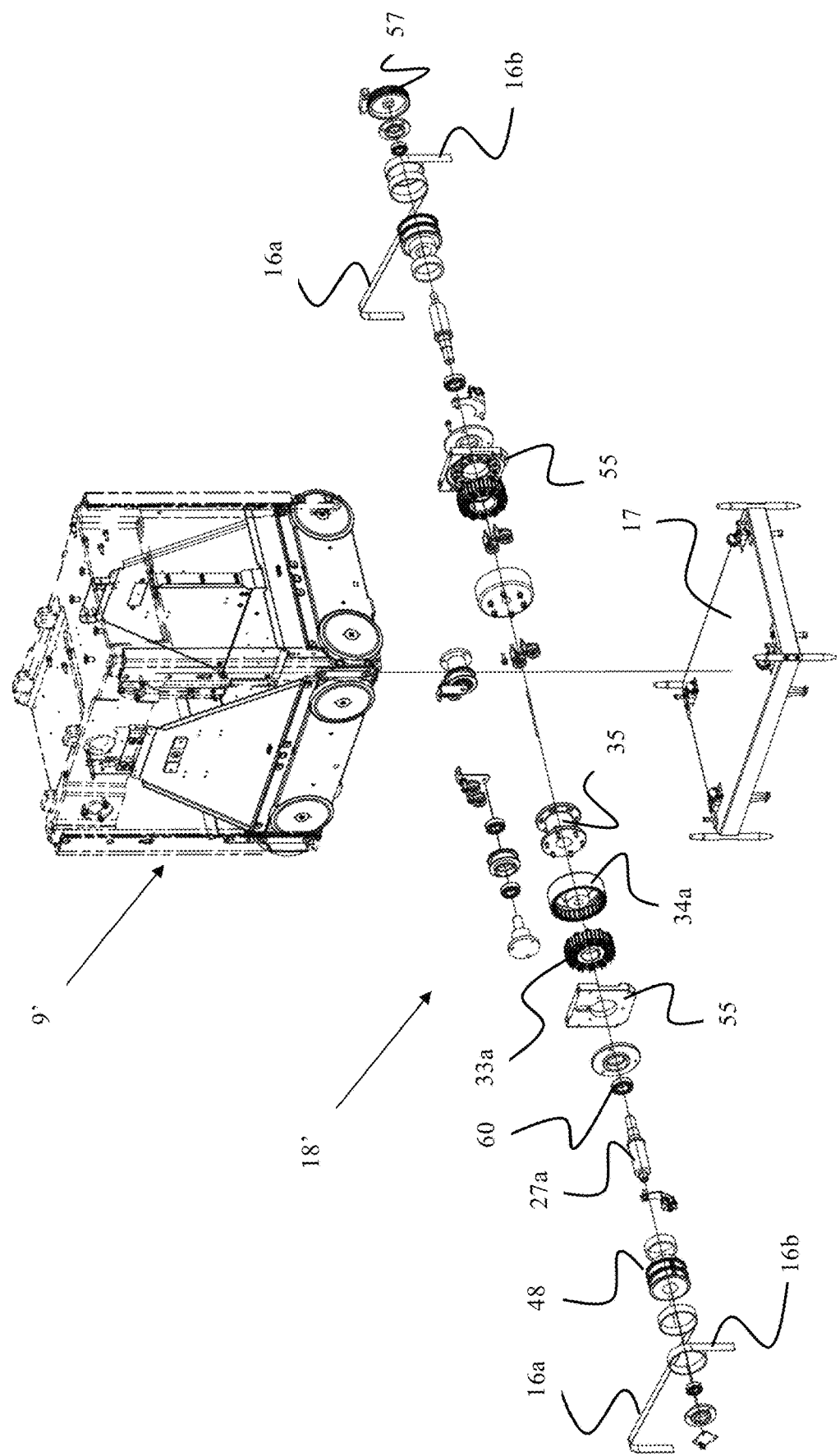
FIG. 10 is an exploded view of the lifting device of the container-handling vehicle in FIG. 5.

As shown in FIGS. 5 and 10, the lifting device 18' comprises a horizontal lifting shaft assembly 47 comprising a lifting shaft 22 and two electric motors 23a, 23b for rotating the lifting shaft 22, a lifting frame 17 for releasable connection to a storage container 6, and a first and second pair of lifting bands 16a,16b. The lifting bands 16a,16b connect the lifting shaft 22 to the lifting frame 17.

The lifting shaft 22 comprises a first end section 27a and a second end section 27b interconnected via an intermediate shaft element 35.

Each lifting band 16a,16b has a first end and a second end connected to the lifting shaft 22 and the lifting frame 17, respectively. Each pair of lifting bands 16a,16b has a first lifting band connected at the first end section 27a of the lifting shaft and a second lifting band connected at the second end section 27b of the lifting shaft. The first pair of lifting bands 16a extends in a substantially horizontal direction from the lifting shaft 22 towards a pair of sheaves 31 (i.e. a band guiding assembly). The sheaves 31 are arranged to change the direction of the first pair of lifting bands 16a to extend in a vertical direction. The second pair of lifting bands 16b extends in a vertical direction directly from the lifting shaft 22.

The lifting band drive assembly of the presently disclosed container-handling vehicle 9', or lifting device 18', requires a minimum of separate parts, i.e. the lifting shaft assembly 47 and the pair of sheaves 31, to achieve its function.

When extending in the vertical direction, the lifting bands 16a,16b are arranged at a horizontal distance from each other corresponding to the horizontal distance between corresponding lifting band connecting elements 32 on the lifting frame 17.

By arranging the lifting shaft assembly 47 such that the second pair of lifting bands 16b extends vertically from the lifting shaft towards the corresponding band connecting elements 32 on the lifting frame 17, the lifting device 18' will occupy a minimum of space inside the robot. In other words, the required position and/or direction of the second pair of lifting bands 16b is obtained without an additional band guiding assembly. Further, by using a minimum of rotational parts (i.e. only the lifting shaft 22 and the sheaves 31) and no gears, sprockets and/or chains (commonly used in prior art lifting devices to transfer rotational movement from e.g. a motor to various shaft assemblies), the lifting device 18' is significantly more silent than prior art lifting devices. The latter is particularly important in a storage system comprising multiple container-handling vehicles.

Although the disclosed band guiding assembly comprises a pair of sheaves 31, it may alternatively be replaced by any suitable means for changing the direction of the first pair of lifting bands from a substantially horizontal direction to the vertical direction, such as a rotational shaft. In the container-handling vehicle 9', each of the sheaves 31 is separately connected to the vehicle body 13. However, depending on the specific design and space requirements, they may alternatively be arranged having a common shaft 53 extending between opposite sides of the vehicle body 13, see FIG. 19.

Figure 16:
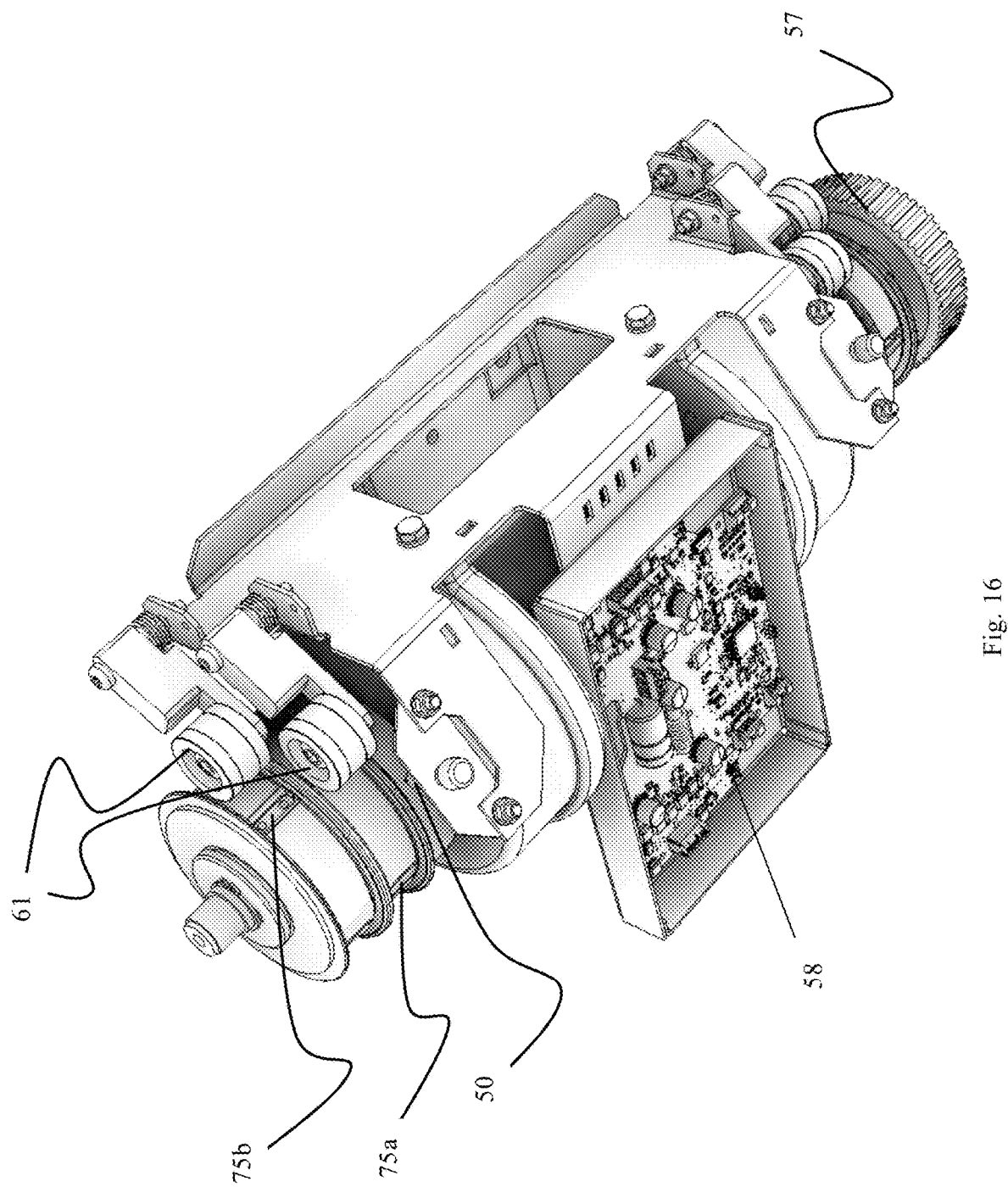
FIG. 16 is a perspective view from below of the lifting shaft assembly in FIGS. 14 and 15.
Figure 17:
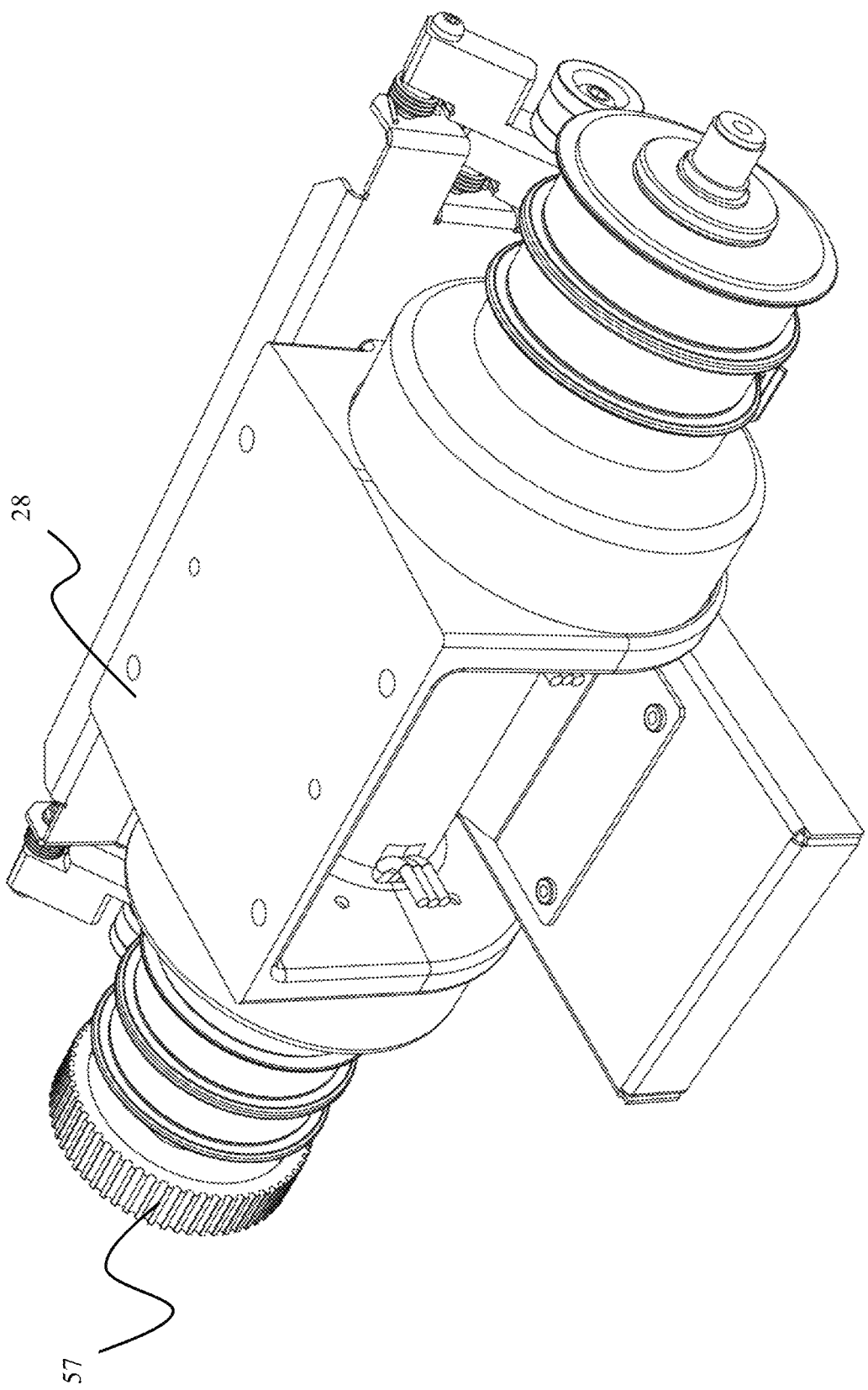
FIG. 17 is a perspective view from above of the lifting shaft assembly in FIGS. 14-16.
Figure 18:
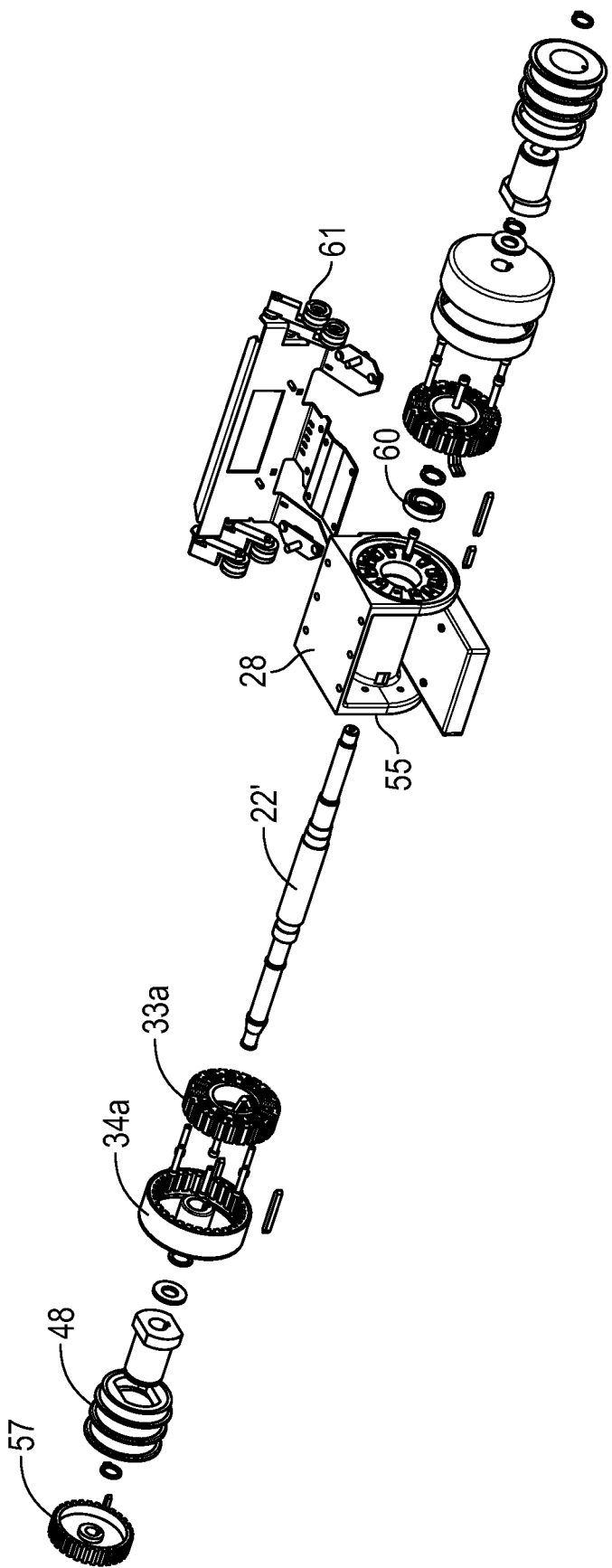
FIG. 18 is an exploded view of the lifting shaft assembly in FIGS. 14-17.

As shown in FIG. 16, spring-loaded guide wheels 61 are arranged to ensure correct travel and positioning of the lifting bands when spooled on/off the dual band reels 48 and when passing over the sheaves 31 of the band guiding assembly.

In the exemplary embodiment, the second pair of lifting bands 16b extends in the vertical direction from the lifting shaft 22 at the side of the lifting shaft facing away from the band guiding assembly 31. In this manner, the required horizontal position of the vertically extending second pair of lifting bands 16b, relative the corresponding band connecting elements of the lifting frame 17, is obtained while keeping the lifting device (and consequently the container-handling vehicle) as compact as possible. In other words, the horizontal extent of the lifting device does not significantly exceed the horizontal periphery of the lifting frame, which would be the case if the second pair of lifting bands 16b extended in the vertical direction from the lifting shaft 22 at the side of the lifting shaft facing the band guiding assembly 31.

Figure 12:
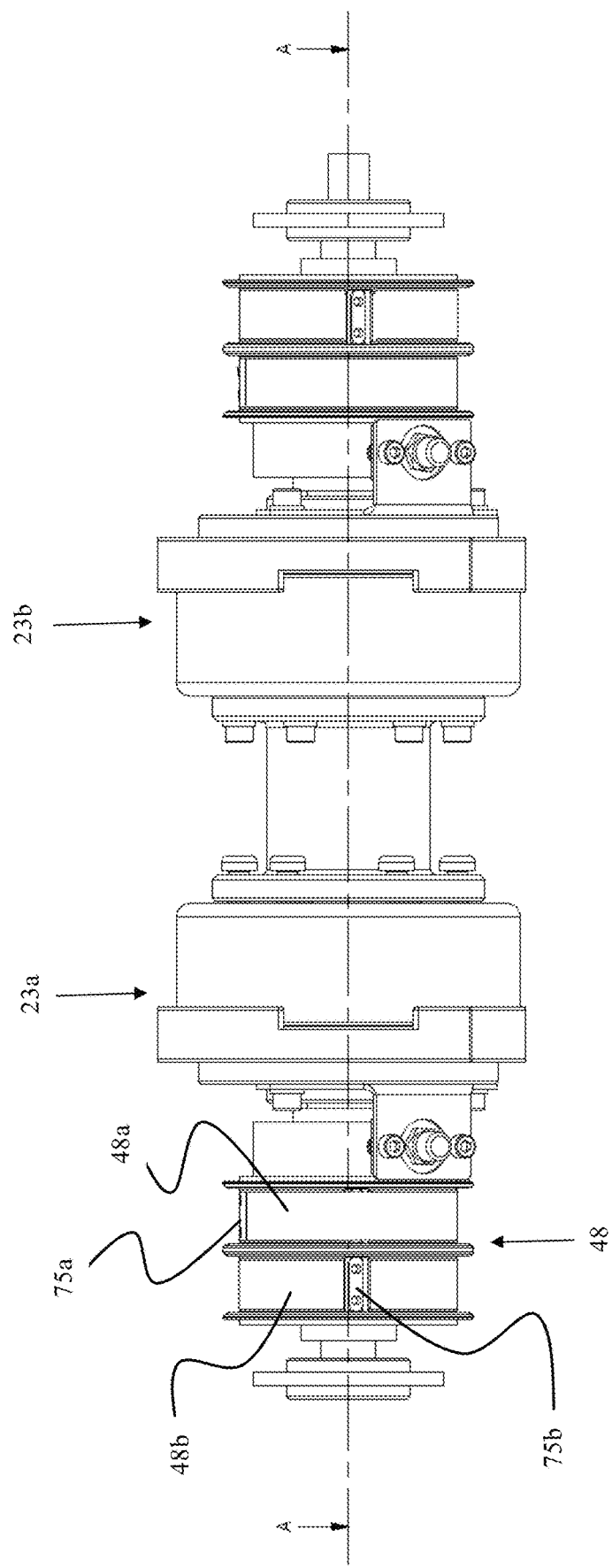
FIG. 12 is a side view of the lifting shaft assembly of the lifting device in FIGS. 10 and 11.
Figure 13:
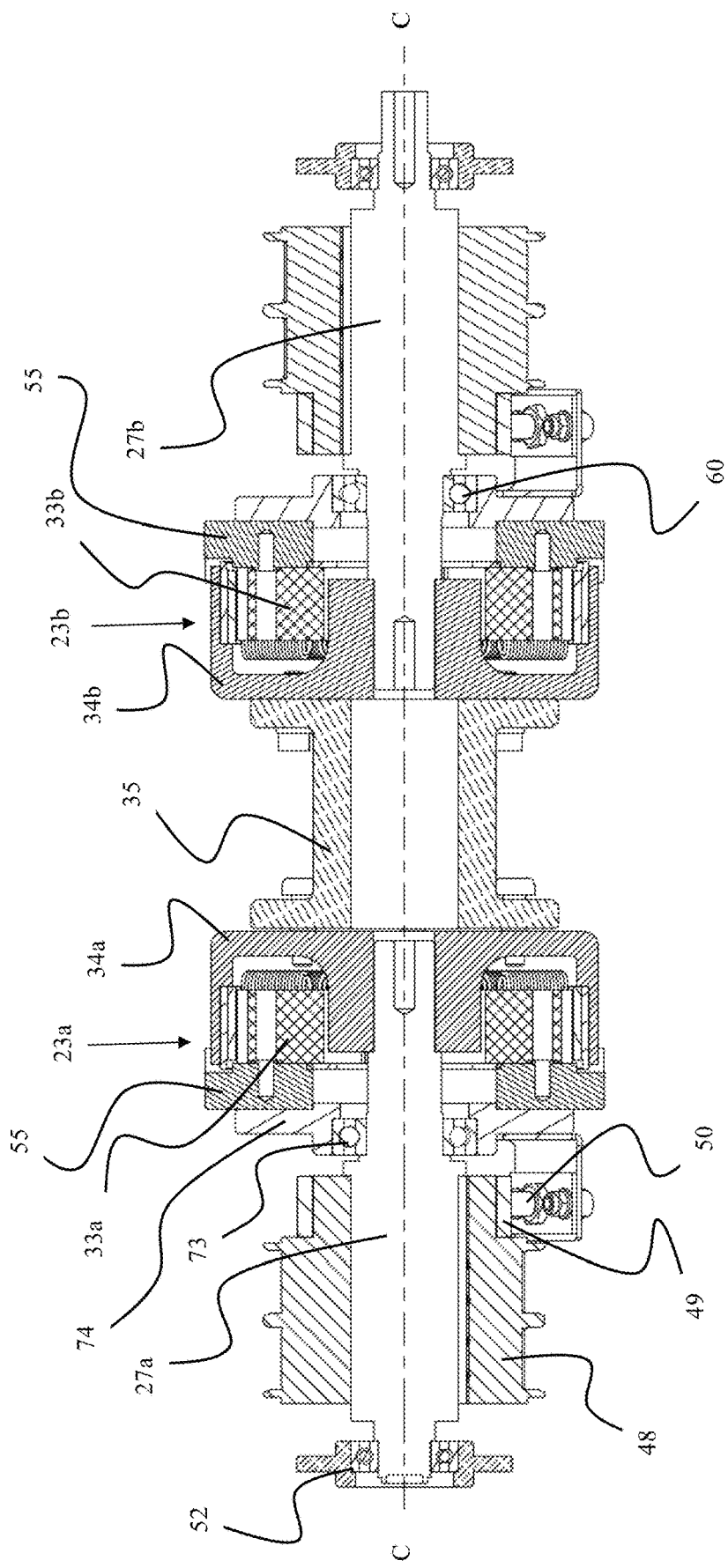
FIG. 13 is a cross-sectional view of the lifting shaft assembly in FIG. 12.
Figure 14:
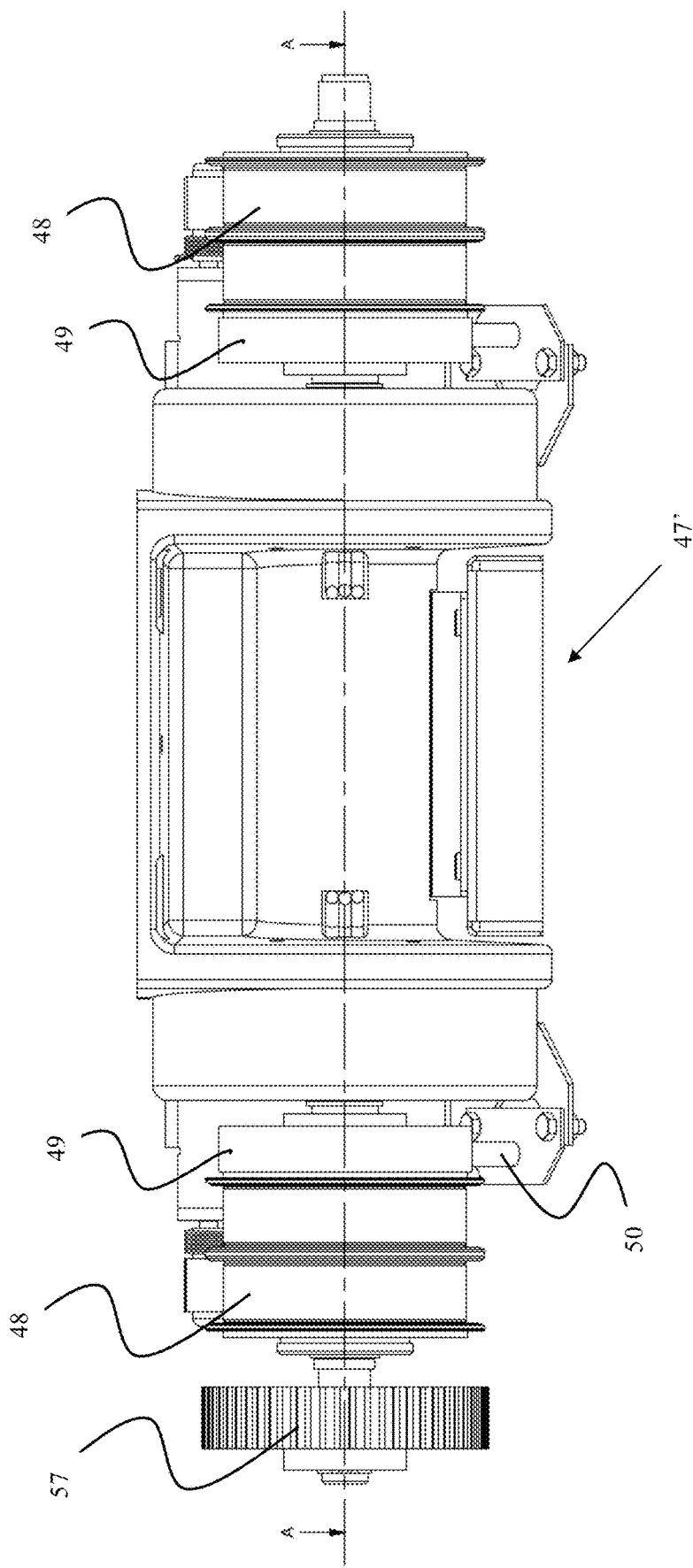
FIG. 14 is a side view of an alternative lifting shaft assembly for use in the lifting device in FIGS. 10 and 11.
Figure 15:
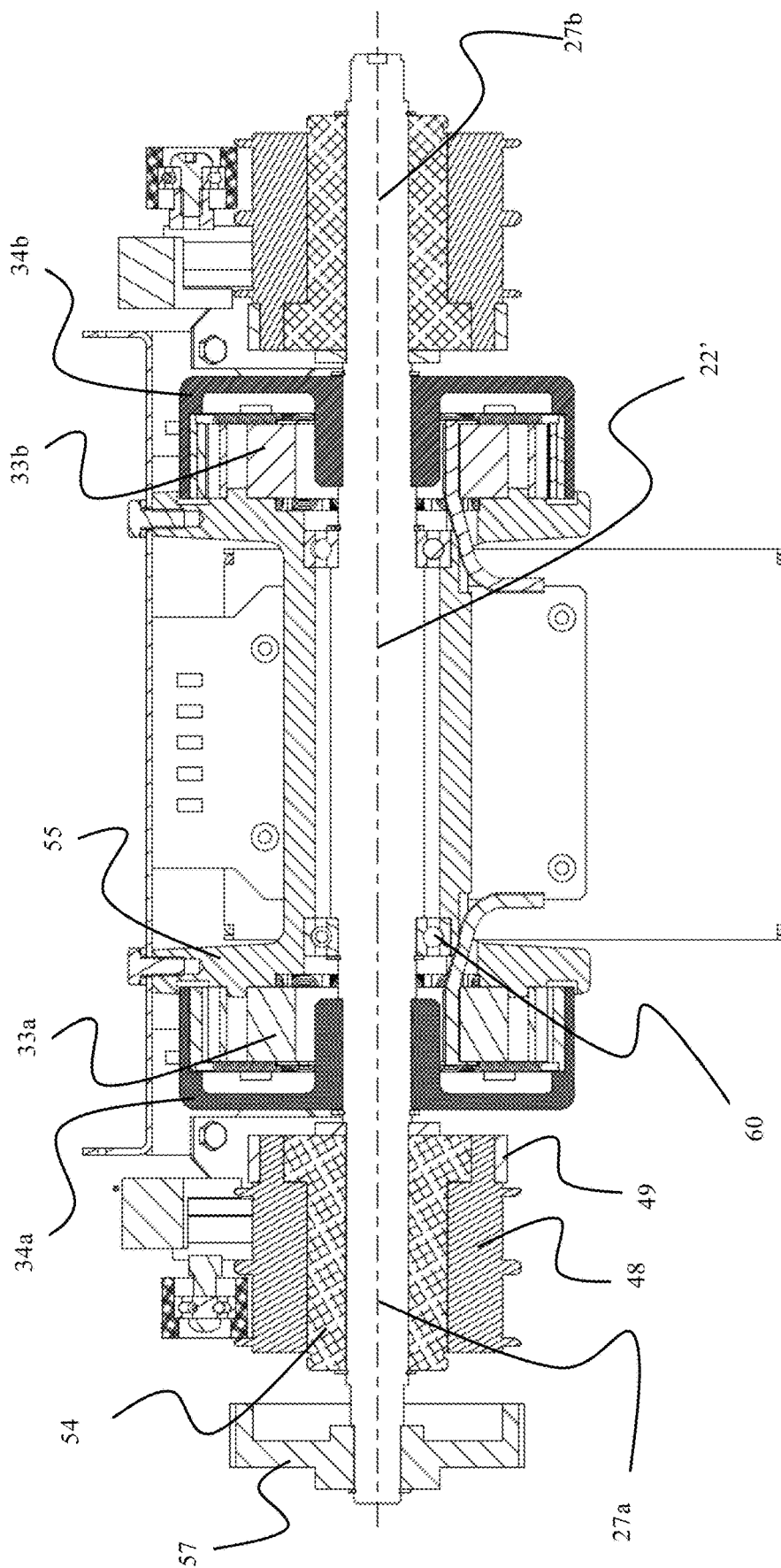
FIG. 15 is a cross-sectional view of the lifting shaft assembly in FIG. 14.

To provide secure spooling of the lifting bands onto the lifting shaft 22, a dual band reel 48, see FIGS. 12 and 13, is arranged at each of the end sections 27a,27b. The dual band reel 48 comprises a first reel sections 48a and a second reel section 48b. Each reel section features a reel band connector 75a,75b for connecting two separate lifting bands, in this case a lifting band from each of the first and second pair of lifting bands 16a,16b. In the lifting device 18' (as well as the lifting device 18" described below) the two pairs of lifting bands 16a,16b extend from the lifting shaft assembly 47 in two different directions, i.e. the first pair of lifting bands 16a extends in a substantially horizontal direction, while the second pair of lifting bands 16b extend in a vertical direction. To obtain an identical travelling distance of all the lifting bands when the lifting shaft is rotated, it is important that all lifting bands have the same length spooled onto the dual band reels at all times. The thickness of the lifting bands is usually about 0.15 mm and the travelling length of a lifting band per rotation of the lifting shaft (or dual band reel) is dependent on the number of layers of lifting band spooled onto the dual band reel. In the disclosed embodiments, this is obtained by having the two reel band connectors 75a,75b of each dual band reel 48 staggered by about 90 degrees (depending on the length and thickness of the lifting bands, the staggering may be within the range of 75-105 degrees). In other words, the two reel band connectors 75a,75b are arranged on their corresponding reel section at a position displaced/staggered by about 90 degrees relative one another and the centreline of the lifting shaft. Further, the dual band reels 48 are arranged such that the band connectors 75a connecting the first pair of lifting bands have the same radial position (i.e. not staggered relative each other), and the band connectors 75b connecting the second pair of lifting bands have the same radial position.

As discussed above, to obtain a correct length of all the lifting bands 16 relative the lifting frame, i.e. such that the lifting frame 17 is kept horizontal during operation, the length of the lifting bands must be adjusted both initially, as well as at various service intervals since they tend to elongate slightly during use. In the prior art lifting devices, the lifting bands are commonly connected and spooled onto separate reels arranged at an upper level within the container-handling vehicle 9. To adjust a lifting band, the corresponding reel may be disconnected from a rotational shaft and the lifting band adjusted by free rotation of the reel relative the rotational shaft. The reel is subsequently fastened to the rotational shaft when the lifting band has the desired length. To obtain access to the separate reels, a service person is commonly required to remove at least some of the bodywork covering the vehicle body 13 or enter the cramped interior of the cavity 21. A variant of the described prior art solution may also be adapted for the exemplary embodiment, e.g. by replacing each dual band reel with two separate band reels which may individually be released to allow free rotation relative to the lifting shaft 22 when the bands are to be adjusted. However, a more efficient and novel solution as described below is preferred.

Figure 7B:
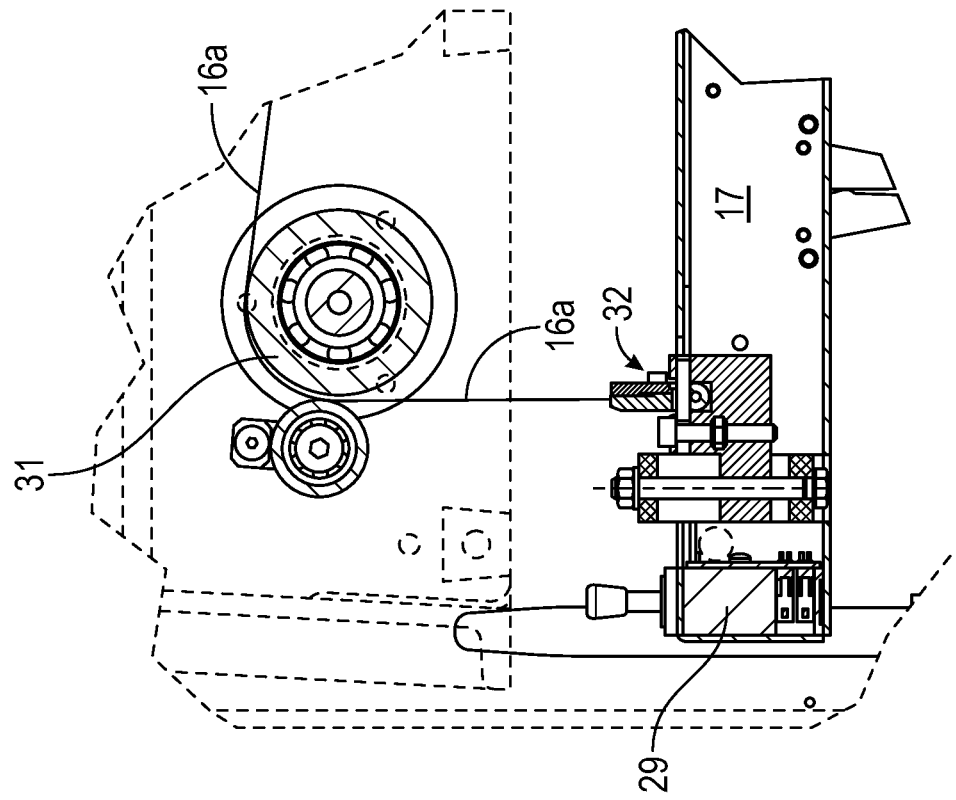
Figure 7A:
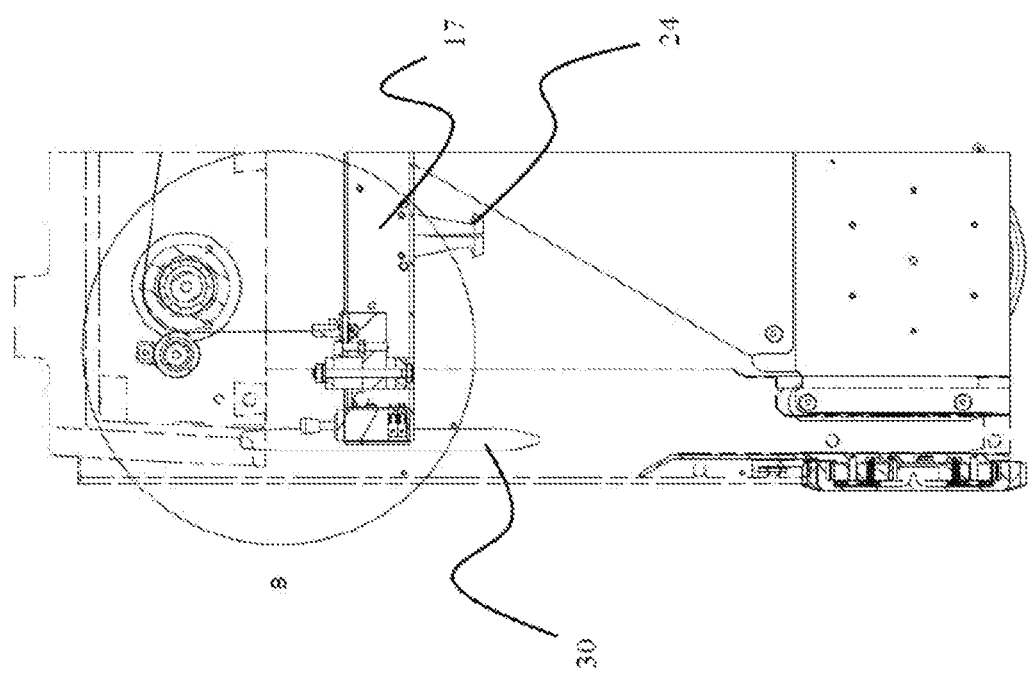
FIG. 7a is a sectional side view of a portion of the container-handling vehicle in FIG. 5.
Figure 8:
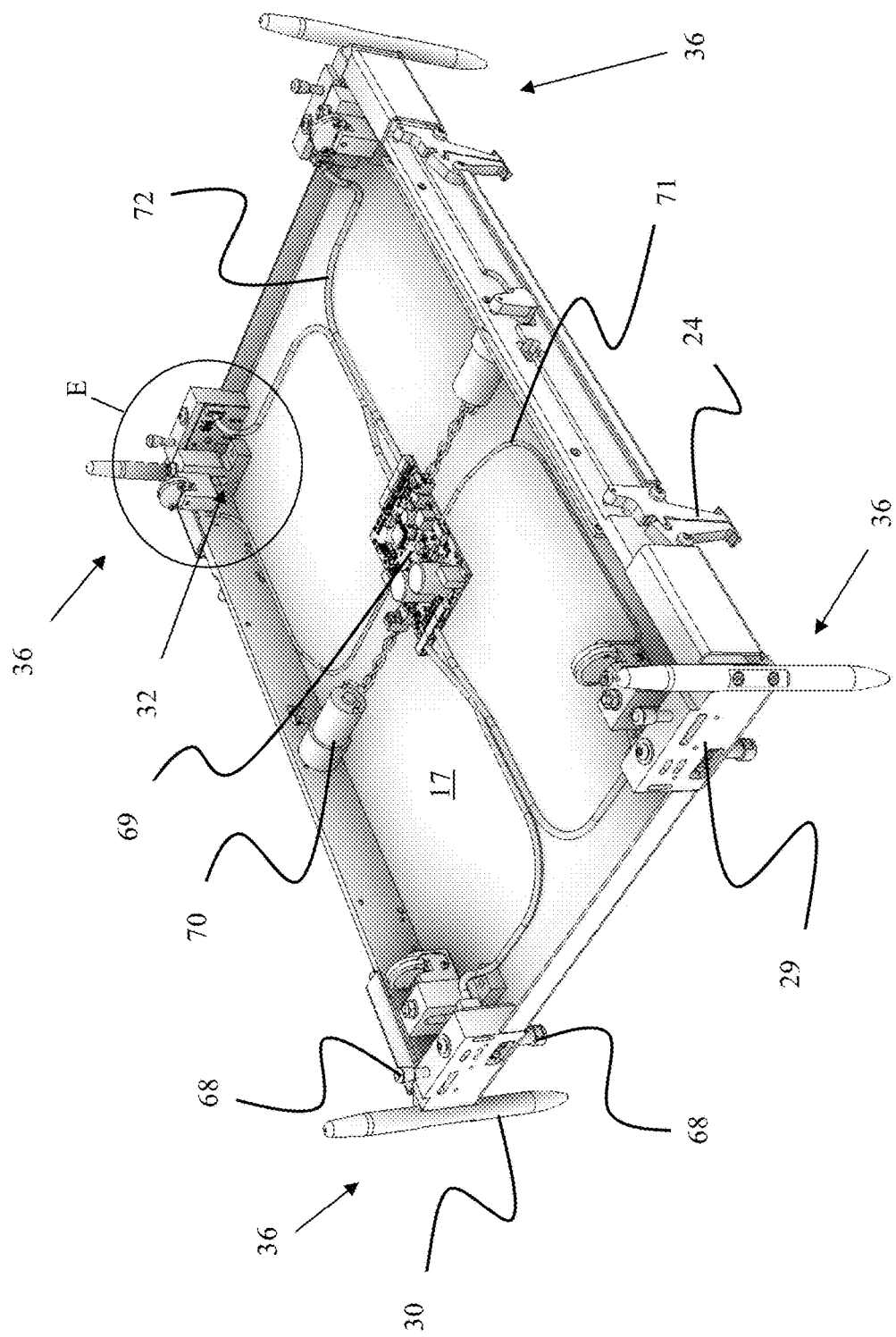
FIG. 8 is a perspective side view of a lifting frame of the container-handling vehicle in FIGS. 5-7.

In the exemplary embodiment, lifting band adjustment is obtained by using a lifting frame 17 featuring adjustable lifting band connectors 32 (or band connecting elements), see FIGS. 7-9. The lifting frame comprises four corner sections 36, a top side 37 and a bottom side 38. Four gripper elements 24 for interaction with a storage container are arranged at the bottom side 38 of the lifting frame 17. A vertical guide pin 30 and a vertically adjustable lifting band connector 32 are arranged at each corner section 36.

As shown in FIGS. 9a-9c each lifting band connector 32 comprises a bracket 39 and a band connector hub 40. The bracket 39 is rigidly connected at the top side of the lifting frame 17. The band connector hub 40 comprises a lifting band clamp 41 (i.e. a band fastening assembly) and is adjustably connected to the bracket 39, such that the band connector hub 40 may be adjusted in a vertical direction relative the bracket 39. The band connector hub 40 is connected to the bracket 39 via an adjustment bolt 42 (i.e. an adjustment element) arranged such that rotation (i.e. actuation) of the adjustment bolt will move the band connector hub 40 in a vertical direction relative the bracket 39. The bracket features a vertical recess/cut-out 43 and the band connector hub 40 comprises an extension 44 arranged in the vertical recess. The recess comprises two vertically opposite smooth bores 45 and the extension features a threaded bore 46 arranged in line with the smooth bores 45. By having the adjustment bolt 42 arranged in the smooth bores and the threaded bore, rotation of the adjustment bolt 42 will move the band connector hub 40 in a vertical direction relative the bracket. Thus, the distance between the lifting frame 17 and the vehicle body 13 may be adjusted such that the lifting frame is horizontal. The feature of being able to adjust the lifting bands at the lifting frame is highly advantageous, since internal access to the body of the container-handling vehicle is not required. Further, the lifting shaft assembly is simplified in that the dual band reels 48 upon which the lifting bands are spooled do not have to be releasably connected to the lifting shaft 22. The latter also entails that the lifting assembly, and any other systems present at an upper level within the container-handling vehicle, may be constructed in a manner not having to take into consideration a required access to the reels. It is noted that the solution of having adjustable lifting band connectors on the lifting frame would be highly advantageous also in the prior art container-handling vehicles.

Metal lifting bands may tear if subjected to unbalanced and high loads. To minimize the risk of unbalanced loads and tearing, the lifting band connector comprises a pivot point P allowing some movement of the lifting band connector in the vertical plane of the connected lifting band, i.e. the pivot point has a centre axis perpendicular to the vertical plane of the lifting band. In the lifting band connector 32, the pivot point P is obtained by a pivot connection 67 between the lifting band clamp 41 and the remainder of the band connector hub 40.

By use of the present lifting frame 17, as well as the lifting frame 17' shown in FIGS. 20-23, the lifting bands may be adjusted in an easy and time efficient manner. When an adjustment is required (i.e. the lifting frame tilts slightly relative the horizontal plane; a situation that may cause the lifting frame getting stuck inside a storage column 12, see FIG. 1), the following steps may be performed:

arranging the container-handling vehicle at a suitable location, for instance at an empty grid column at the periphery of the storage grid 4;

lowering the lifting frame out of the cavity of the container-handling vehicle, such that a service person has access to the lifting frame; and adjusting the lifting band(s) by movement of the band connector hub of the respective lifting band connector 32, such that the lifting frame is in the horizontal plane. In the specific lifting band connector disclosed in FIGS. 7-9, this step will entail rotation of the respective adjustment bolt(s) (i.e. the adjustment element(s)).

In some instances, when lowered out of the cavity, the lifting frame is lowered to a base structure on which the frame is supported in the desired horizontal position. When the lifting frame is kept horizontal, the lifting band(s) which has been elongated/stretched during use is no longer tensioned, i.e. the elongated/stretched lifting band(s) has some slack relative the other lifting bands. The lifting band adjustment is then easily performed by simply tensioning the slack lifting band(s) by use of the respective adjustable lifting band connector 32.

In the exemplary embodiment, as well as in some prior art container-handling vehicles, the lifting bands are made of metal (commonly a steel alloy) and are used to conduct signals and electric power to end switch modules 29 and a control module 69 arranged on the lifting frame 17. The end switch modules 29 comprises spring-loaded pins 68 (see FIG. 21) for detecting when the lifting frame is in contact with a storage container 6 and when the lifting frame is raised to its uppermost level within the cavity. To avoid short-circuiting the signal/electric power passing through the lifting bands, at least parts of the bracket 39 is made in a non-conducting material, such as a suitable plastic or composite material, such that the lifting bands (i.e. a lifting band from each of the dual band reels 48) are only in electric contact (via wires 71) with the lifting frame 17 at the control module 69. Thus, at least parts of the lifting band clamp 41 is made in an electrically conductive material, e.g. any suitable metal.

Each end switch module 29 is electrically connected (wires 72), via the control module to two lifting band clamps 41 (or band connector hubs) having a different potential, such that signals/electric power may be received from, or sent to, a main control unit (not shown, but similar to the main control unit 58 in FIG. 16) inside the container-handling vehicle.

The control module 69 is also connected to and controls gripper motors 70 which drive the gripper elements 24.

To transfer signals and/or electric power from the main control unit, each dual band reel 48 features a slip ring 49 for electric signal transfer between the main control unit and the lifting bands via a conducting brush 50 in contact with the slip ring 49, see FIG. 13. The dual band reels are made in an electrically conducting material, such as a suitable metal. Although shown as a single reel, each dual band reel may comprise to distinct reels, one for each lifting band, as long as the two distinct reels are in electric contact with each other and the slip ring.

Figure 11:
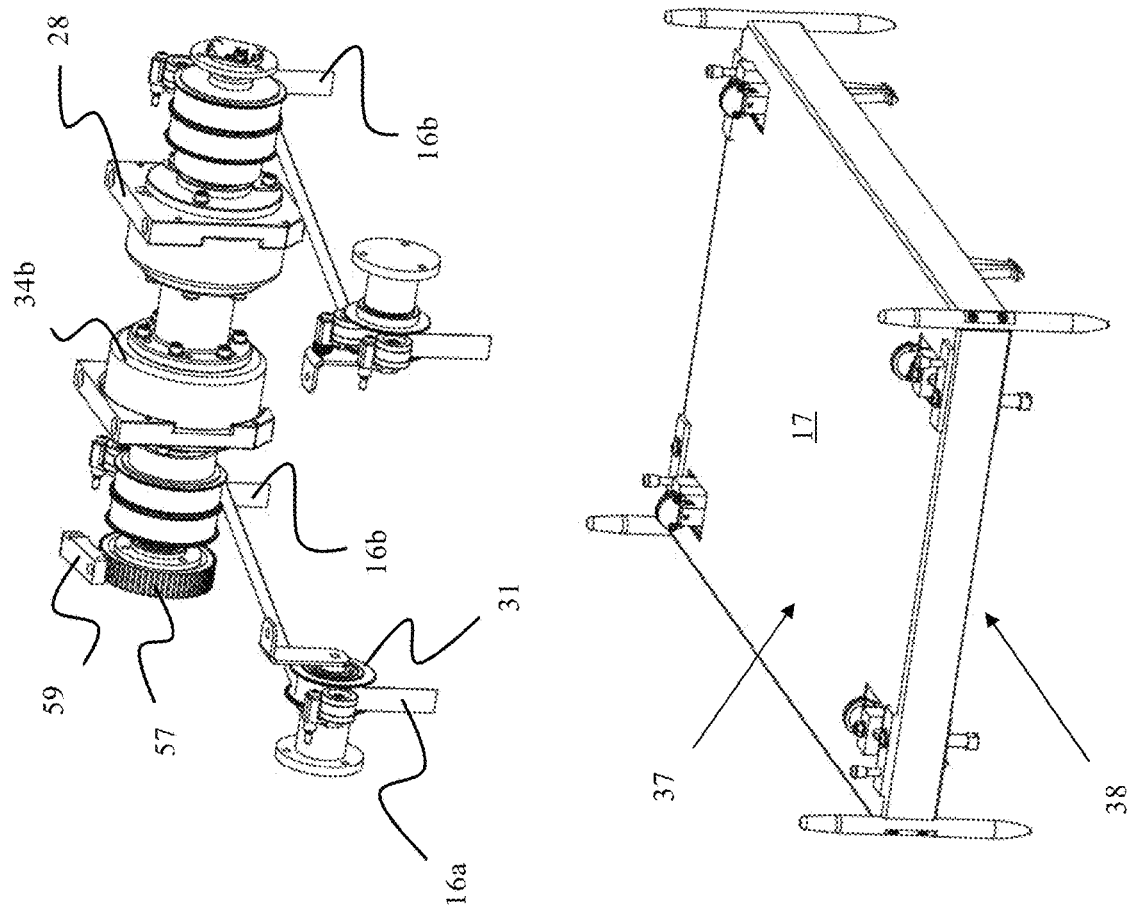
FIG. 11 is a perspective side view of the lifting device of the container-handling vehicle in FIG. 5.

For illustrative purposes, the lifting device 18' (i.e. the lifting shaft assembly 47, the lifting frame 17 and the two pairs of lifting bands) is shown in an exploded view in FIG. 10 and in a perspective view isolated from the vehicle body 13 in FIG. 11.

In the lifting shaft assembly 47, the two electric motors 23a, 23b are brushless DC (BLDC) electric motors, each comprising a stator 33, a stator connecting element 55 and a rotor element 34, see FIGS. 12 and 13. To transfer rotary motion from the rotor elements 34a,34b of the electric motors to the lifting shaft 22 (i.e. the shaft made up of the first end section 27a, the second end section 27b and the intermediate shaft element 35), the rotor elements 34a,34b are interconnected via the intermediate shaft element 35 and each rotor element is connected to a respective end section 27a,27b. The rotor elements, the end sections and the intermediate shaft element have a common centreline C. To allow spooling of all the lifting bands (i.e. both pairs of lifting bands 16a,16b) onto a single lifting shaft 22, while at the same time being able to use the lifting bands as conductors for signals/electric power, as described above, the dual band reels 48 (or the end sections 27a,27b) must be electrically insulated from each other. In this manner the lifting bands connected to the dual band reel 48 at the first end section 27a may have a differential electric potential relative the lifting bands connected to the dual band reel 48 at the second end section 27b. In the lifting shaft assembly 47, this is achieved by having the intermediate shaft element 35 made in an electrically insulating material (i.e. providing an electrical insulating element), such as a suitable plastic/composite material.

The lifting shaft assembly 47 comprises a ball bearing element 52 on each of the end sections 27a,27b for rotatable connection of the end sections to the body 13 of the container-handling vehicle. The stator connecting element 55 of each stator 33a,33b comprises a motor bracket 28 for rigid connection to the body 13 of the container-handling vehicle and a ball bearing 60 for rotary connection to the lifting shaft. In this manner, the lifting shaft 22 is rotatable relative the body 13, while the stators are kept stationary. To avoid short-circuiting via the vehicle body 13, the ball bearing elements 52 has a plastic housing insulating the respective end sections from the vehicle body 13. Similarly, the stator connecting elements 55 are insulated from the end sections 27a,27b by the plastic housings 74 of the ball bearing elements 73 to avoid short circuiting via the motor brackets 28.

An alternative embodiment of a lifting shaft assembly 47' is shown in FIGS. 14-18.

A differentiating feature of the alternative lifting shaft assembly 47', in view of the lifting shaft assembly 47 described above, is the construction of the lifting shaft 22' as a single element, i.e. the lifting shaft 22' may be termed a unitary lifting shaft. In the lifting shaft assembly 47, the intermediate shaft element 35, interconnecting the first end section 27a and the second end section 27b, is able to electrically insulate the two end sections, and consequently the two dual band reels 48, by being made in an electrically insulating material. To obtain the same feature of electrically insulating the dual band reels 48, the alternative lifting assembly 47' features a sleeve-shaped element 54 made of electrically insulating material (i.e. an electrical insulating element) arranged between each of the first end section 27a and the second end section 27b and the corresponding dual band reels 48 (alternatively, each dual band reel 48 may be defined as comprising an inner section/element 54 in an electrically insulating material). An advantageous effect of insulating each dual band reel from its respective end section is that the lifting shaft assembly 47' is not required to be electrically insulated from the vehicle body 13 at its contact points, e.g. ball bearings 52, see above.

The motor(s) 23 of the lifting shaft assembly 47' features two stators 33a,33b, two rotor elements 34a,34b and a stator connecting element 55 being common for both stators 33a,33b. The stator connecting element 55 comprises a motor bracket 28 for rigid connection to the body 13 of the container-handling vehicle and ball bearings 60 for rotary connection to the lifting shaft 22'. A lift brake wheel 57 is arranged at one end of the lifting shaft assembly 47'. To actuate the brake wheel, a cooperating brake actuator arm 59 is commonly connected to the vehicle body 13.

Figure 20:
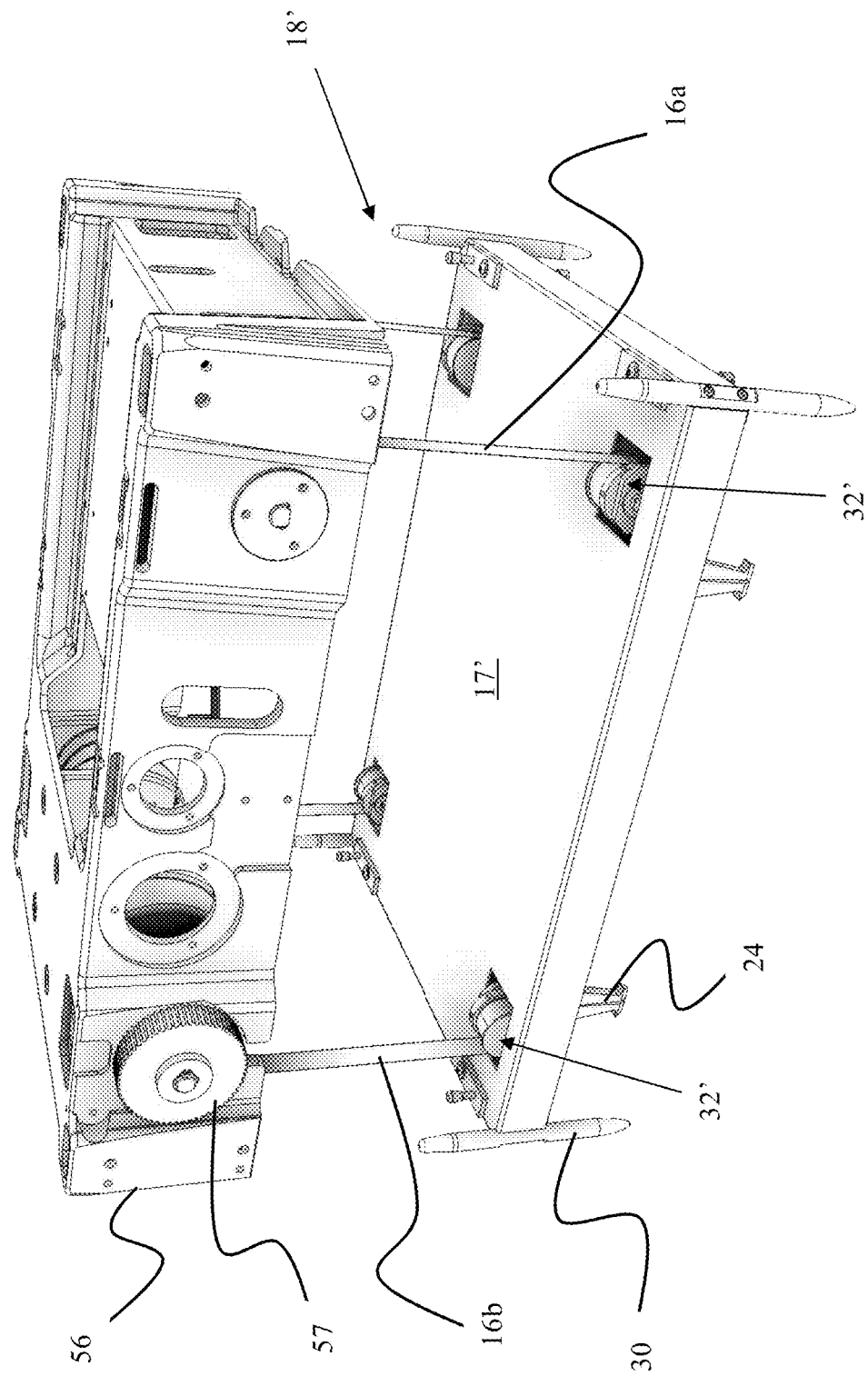
FIG. 20 is a perspective side view of the lifting device frame in FIG. 19 comprising lifting bands and a lifting frame.
Figure 19:
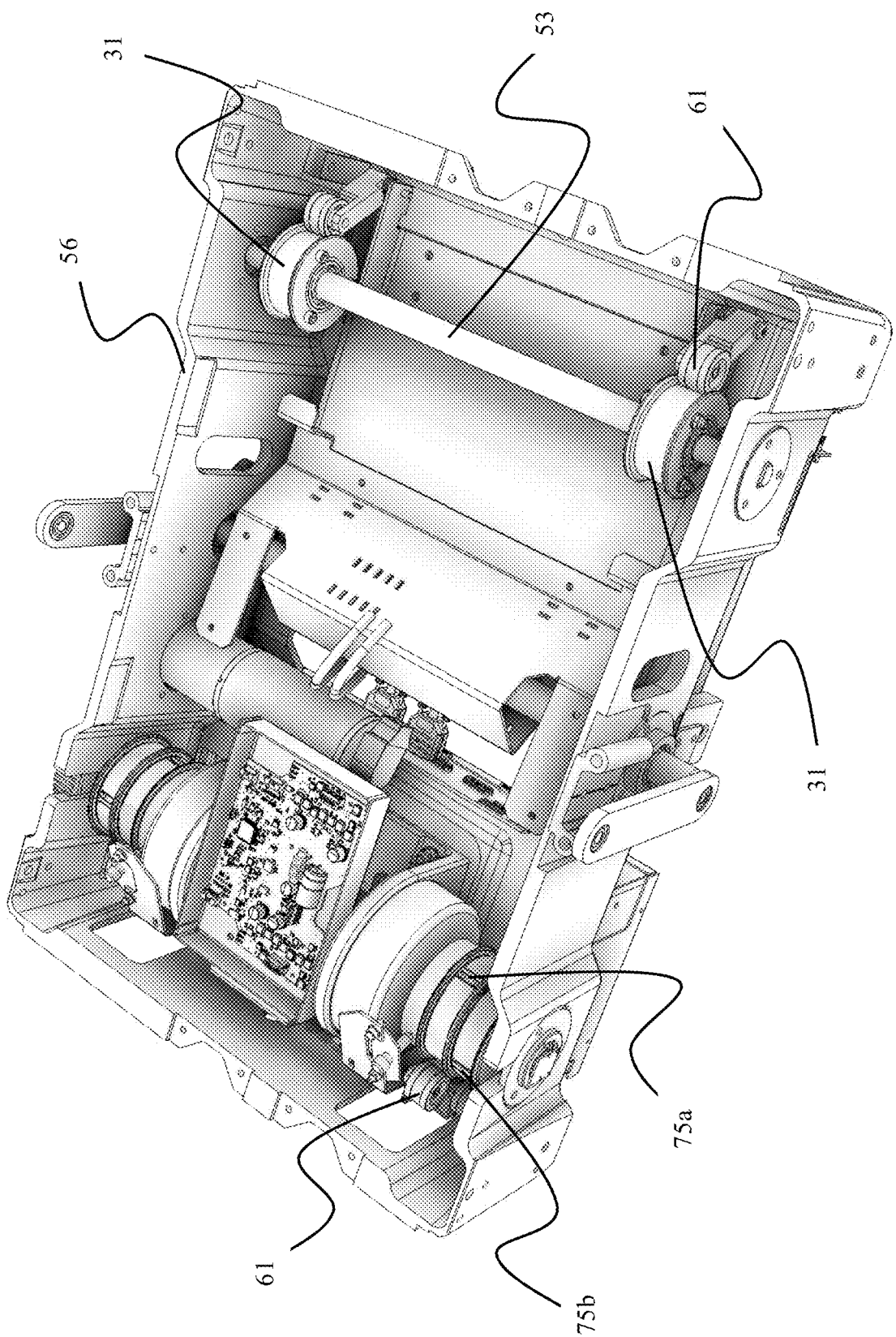
FIG. 19 is a perspective view from below of a lifting device frame comprising the lifting shaft assembly in FIGS. 14-17.

A lifting device 18" based on the alternative lifting shaft assembly 47' is shown in FIGS. 19 and 20. In this specific embodiment, the lifting device 18" is arranged in a frame 56. The frame 56 constitutes an upper part of the vehicle body 13 of an assembled container handling vehicle 9', see FIG. 23.

Figure 21:
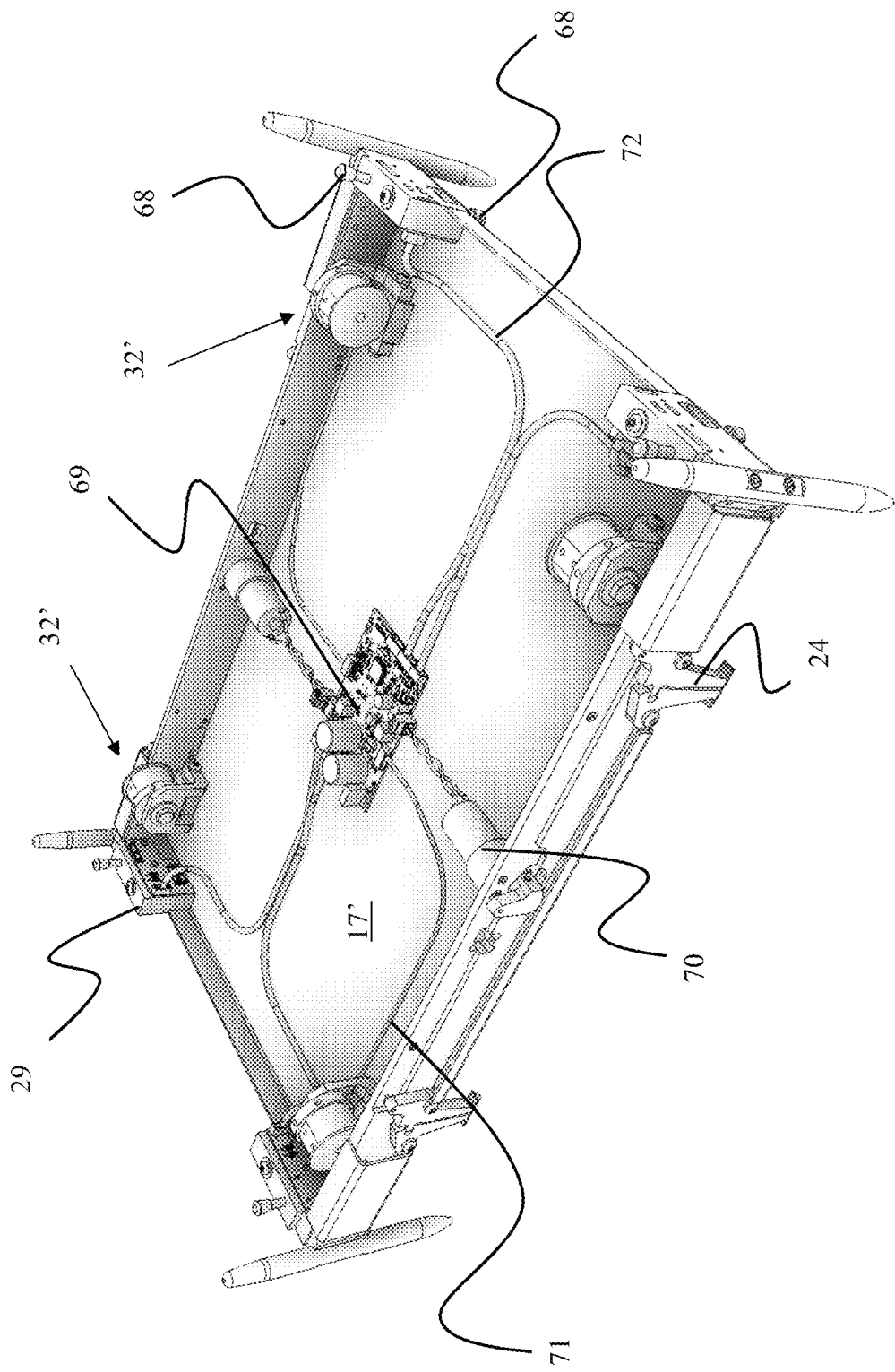
FIG. 21 is a perspective side view of the lifting frame shown in FIG. 20 with a top cover omitted.

The lifting frame 17' of the lifting device 18" has most of its features in common with the lifting frame disclosed in FIGS. 7-9, but comprises an alternative type of adjustable lifting band connectors 32', see FIGS. 21 and 22. Each of the adjustable lifting band connectors 32', see FIGS. 21 and 22, comprises a bracket 39' and a band connector hub 63,64. A pivot point P is obtained by having the bracket 39' pivotally arranged at an upper side of the lifting frame 17' via a pivot connection 66 to a connecting block 62 (or intermediate bracket element). The purpose of the pivot point P is described above in connection with the lifting band connector 32 in FIGS. 7-9. The band connector hub comprises a lifting band reel 63 and a locking bolt 64 (i.e. an adjustment element). The lifting band reel features a connecting interface 65 for a lifting band (i.e. a band fastening assembly) and is rotatably connected to the bracket 39'. The rotational connection of the lifting band reel is controlled by the locking bolt 64. When the locking bolt 64 is tightened the lifting band reel 63 is prevented from rotating, and when the locking bolt is loosened, rotation of the lifting band reel is allowed. By rotating the lifting band reel, the lifting band connected thereto may be spooled on/off such that the distance between the lifting frame and the vehicle body may be adjusted. An advantage of the lifting band connectors 32' is that the vertical adjustment range is increased. To avoid short-circuiting, at least parts of the lifting band connectors, such as the bracket 39' or the connecting block 62, are made in a non-conducting material, such as a suitable plastic or composite material.

Figure 23:
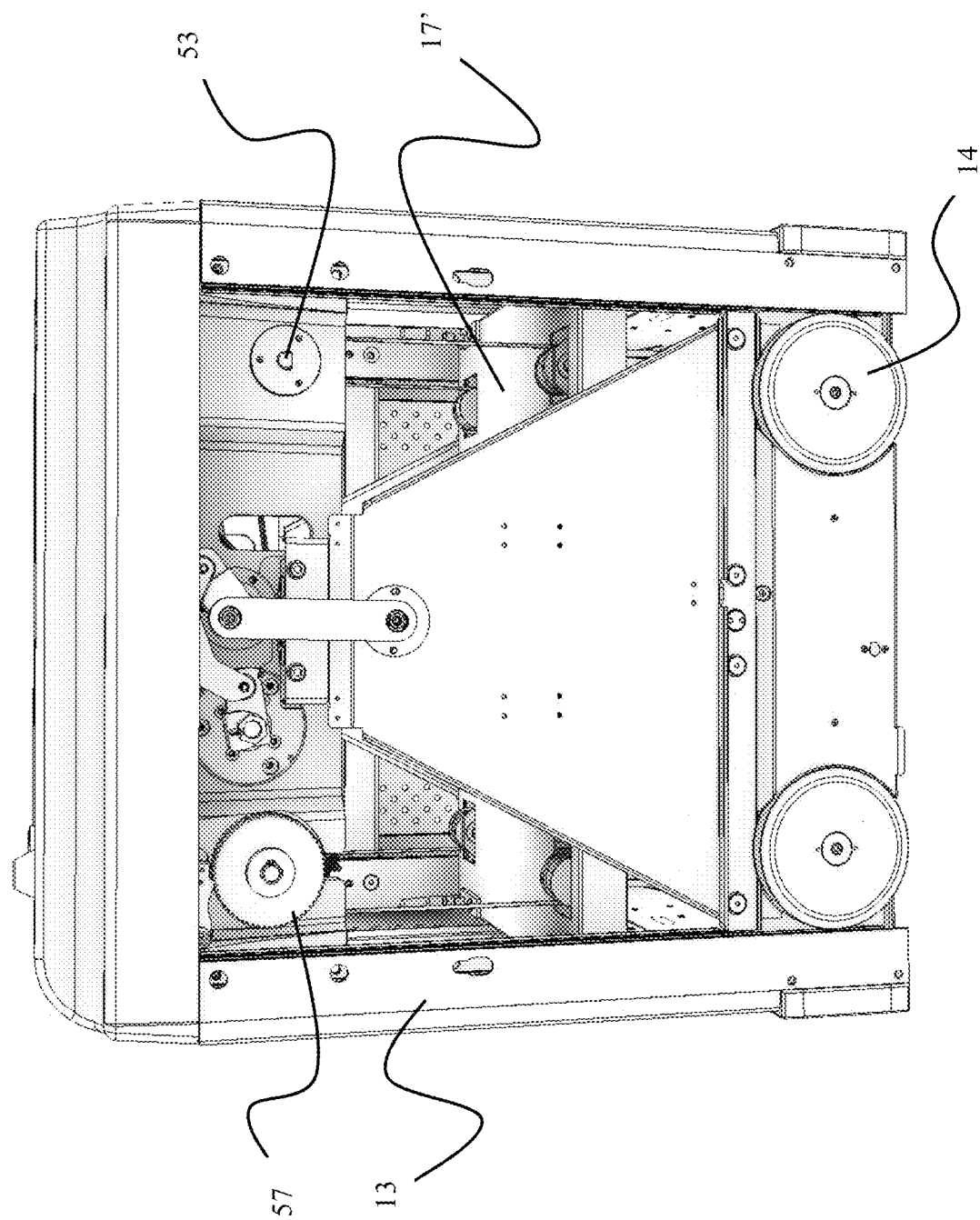
FIG. 23 is a side view of a container-handling vehicle comprising a lifting frame and lifting device as shown in FIG. 20.

A container-handling vehicle featuring a frame 56 and lifting device 18' is shown in FIG. 23.

It is noted that in other embodiments, the lifting shaft assemblies 47,47' may comprise only one motor or more than two motors. This will depend on the required torque of the lifting shaft 22,22' as well as the torque and size of current BLDC motors. For example, if the motor 23a connected to the first end section 27a of the lifting shaft assembly 47 was able to provide sufficient torque alone, the other motor 23b could be replaced by an element simply connecting the second end section 27b and the intermediate shaft element 35. Various alternative solutions would be obvious to the skilled person based on the teachings of the present disclosure. A common feature of all disclosed lifting shaft assemblies 47,47' is that the at least one motor 23a,23b is arranged between the first and second end section of the lifting shaft 22,22' to ensure a compact lifting shaft assembly.

Various types of brushless DC motors are known, including permanent magnet synchronous motor (using permanent magnets) and switched reluctance motors (does not use any permanent magnets).

The working principles of the permanent magnet synchronous brushless DC motor is well known to the skilled person, e.g. as described in https://en.wikipedia.org/wiki/Brushless_DC_electric_motor, and typically uses one or more permanent magnets in the rotor and electromagnets on the motor housing for the stator. A motor controller converts DC to AC. This design is mechanically simpler than that of brushed motors because it eliminates the complication of transferring power from outside the motor to the spinning rotor.

A further exemplary container-handling vehicle 9''' according to the invention is shown in FIGS. 24-26. The vehicle features a lifting device (i.e. a lifting shaft assembly 47''', two pairs of lifting bands 16a,16b, a lifting frame 17' and a band guiding assembly) similar to the lifting devices 18',18" disclosed above. The main differentiating feature of this embodiment is that the lifting shaft assembly 47''' does not comprise a motor arranged between the two dual band reels 48 on the lifting shaft 22'. Instead, a motor 76 is connected at the end of the end section 27b, see FIG. 24 (Section A-A). The band guiding assembly is not shown but comprises two sheaves 31 arranged on a common shaft 53 as shown in FIG. 19. Space for the motor 76 is provided by having a vehicle body design comprising a side section in addition to the main section in which the lifting frame is arranged. The main section has a footprint similar to the footprint of the container-handling vehicle 9' in FIG. 5. An advantage of this solution is that it allows for a larger and stronger motor if needed. Further, the motor 76 may be any suitable type of electric motor. Electric insulation of the two dual band reels 48 is obtained as disclosed for the embodiment in FIG. 15. The lifting bands are connected to adjustable lifting band connectors 32' on the lifting frame 17, similar to the connectors disclosed in FIGS. 21 and 22.

Figure 27:
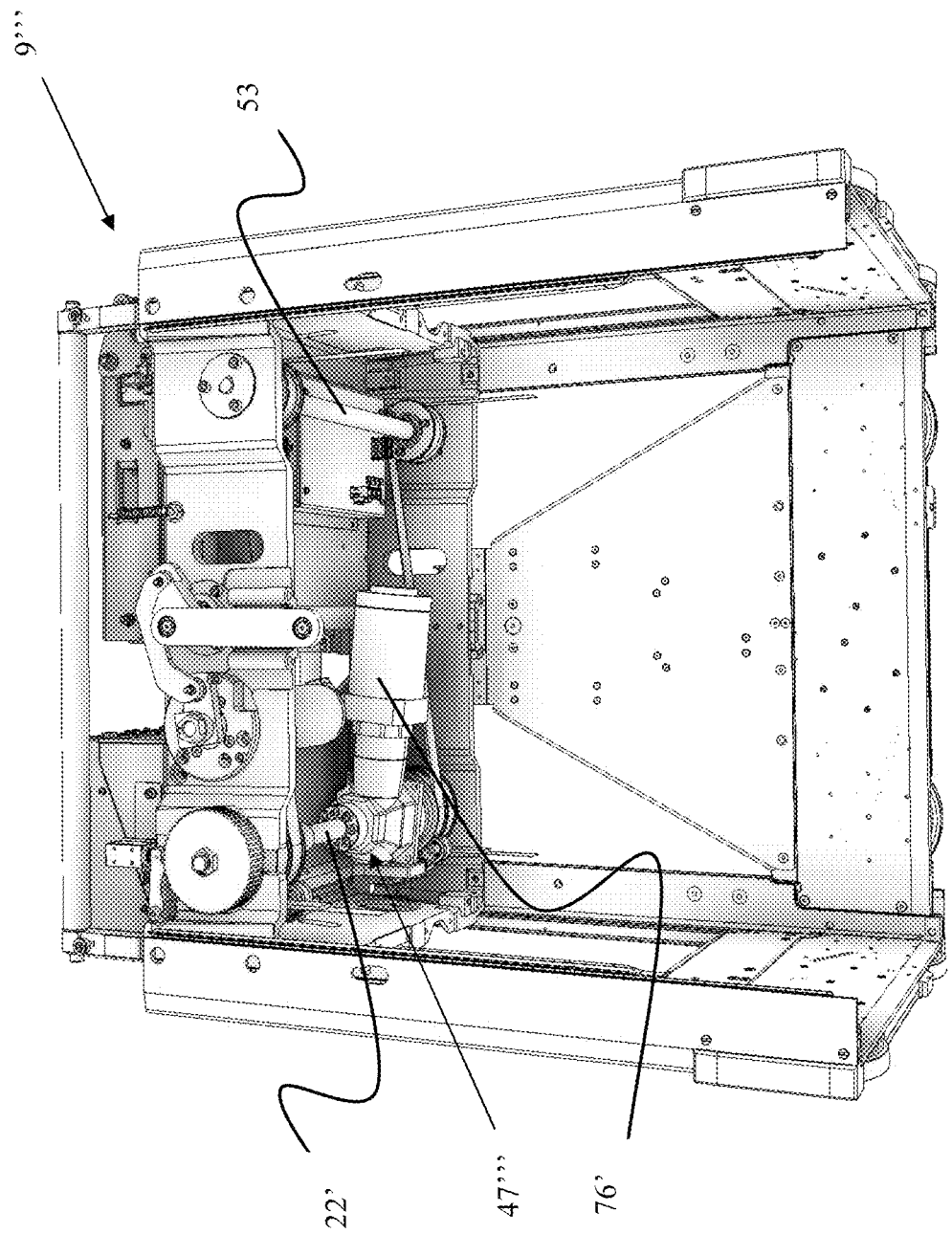
FIG. 27 is a perspective side view of yet an exemplary embodiment of a container-handling vehicle according to the invention.
Figure 28:
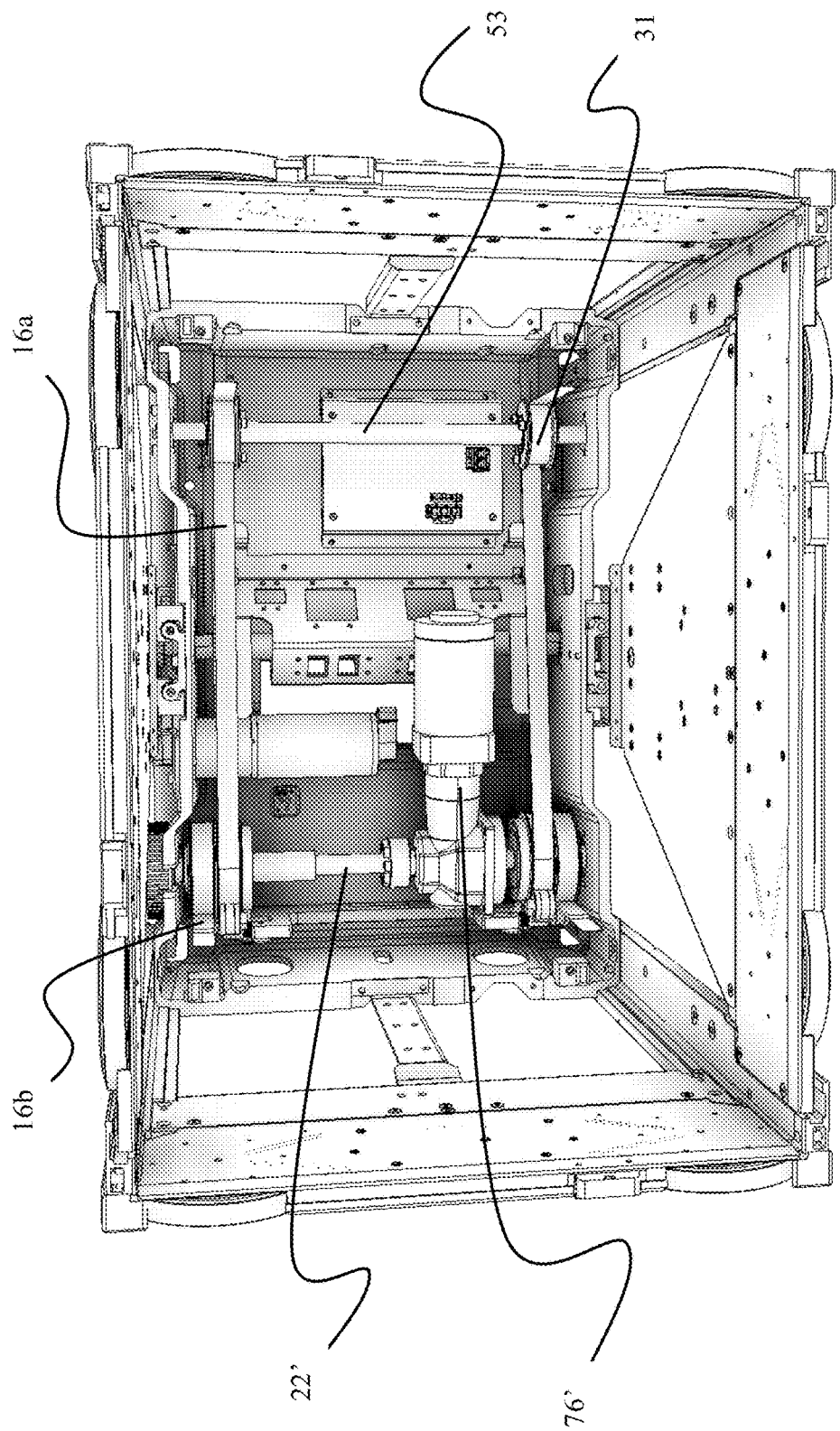
FIG. 28 is a perspective view from below of the container-handling vehicle in FIG. 27.

Yet an exemplary container-handling vehicle 9''' according to the invention is shown in FIGS. 27-28. The vehicle features a lifting device (i.e. a lifting shaft assembly 47', two pairs of lifting bands 16a,16b, a lifting frame (not shown) and a band guiding assembly similar to the lifting devices 18',18" disclosed above. The main differentiating feature of this embodiment in view of the container-handling vehicle in FIGS. 24-26 is that the motor 76' of the lifting shaft assembly 47' is arranged between the two dual band reels 48 on the lifting shaft 22'. To allow room for a storage container in the cavity, the motor is arranged in a substantially horizontal direction.

The lifting shaft assemblies 47-47''' and the lifting frames 17,17' are disclosed in connection with a specific lifting band drive assembly 47-47''',31 and type of container-handling vehicle 9',9" having a cavity spaced to receive a single storage container. However, both the lifting shaft assemblies 47-47' and the lifting frames 17,17' may advantageously be used separately or in any combination in any type of lifting band drive assembly or container-handling vehicle.

The invention claimed is:

1. A container-handling vehicle for picking up storage containers from a three-dimensional grid of an underlying storage system, comprising a vehicle body and at least one lifting device, wherein the at least one lifting device comprises a lifting shaft assembly comprising a lifting shaft and at least one motor for rotating the lifting shaft, a lifting frame for releasably connecting a storage container, and a first pair of lifting bands and a second pair of lifting bands connecting the lifting shaft to the lifting frame,
wherein the lifting shaft comprises a first end section and a second end section;
wherein each lifting band has a first end and a second end connected to the lifting shaft and a corresponding lifting band connector on the lifting frame, respectively;
wherein each pair of lifting bands has a first lifting band connected at the first end section of the lifting shaft and a second lifting band connected at the second end section of the lifting shaft;
wherein the first pair of lifting bands extends in a substantially horizontal direction from the lifting shaft towards a band guiding assembly, wherein the band guiding assembly is arranged to change the direction of the first pair of lifting bands to extend in a vertical direction; and
wherein the second pair of lifting bands extends in a vertical direction from the lifting shaft at a side of the lifting shaft facing away from the band guiding assembly, and the connections between the first ends of the first pair of lifting bands and the lifting shaft are staggered by 75-105 degrees relative the connections between the first ends of the second pair of lifting bands and the lifting shaft.

2. The container-handling vehicle according to claim 1, wherein the band guiding assembly and the lifting shaft are arranged such that each lifting band extends in a vertical direction at a horizontal position corresponding to the horizontal position of the corresponding lifting band connector on the lifting frame.

3. The container-handling vehicle according to claim 1, wherein the band guiding assembly comprises a sheave for each lifting band of the first pair of lifting bands.

4. The container-handling vehicle according to claim 1, wherein the lifting frame comprises four corner sections and a lifting band connector connected to one of the lifting bands is arranged at each corner section, wherein the band guiding assembly and the lifting shaft are spaced such that each lifting band extends in a vertical direction at a horizontal position corresponding to the horizontal position of the lifting band connector to which the lifting band is connected.

5. The container-handling vehicle according to claim 1, wherein the at least one motor is a brushless DC motor comprising a stator element and a rotor element, and the lifting shaft is connected to, or constitutes a part of, the rotor element.

6. The container-handling vehicle according to claim 5, wherein the at least one motor is arranged between the first end section and the second end section of the lifting shaft.

7. The container-handling vehicle according to claim 1, wherein the connections between the first ends of the first pair of lifting bands and the lifting shaft are staggered by about 90 degrees, relative the connections between the first ends of the second pair of lifting bands and the lifting shaft.

8. The container-handling vehicle according to claim 1, wherein at least three lifting band connectors are adjustable, such that a level of corresponding corner sections is adjusted.

9. The container-handling vehicle according to claim 1, comprising:
a first set of wheels arranged at opposite sides of the vehicle body, for moving the container-handling vehicle along a first direction on the three-dimensional grid;
a second set of wheels arranged at opposite sides of the vehicle body, for moving the container-handling vehicle along a second direction on the three-dimensional grid, the second direction being perpendicular to the first direction; and
the first set of wheels displaceable in a vertical direction between a first position, wherein the first set of wheels allow movement of the container-handling vehicle along the first direction, and a second position, wherein the second set of wheels allow movement of the container-handling vehicle along the second direction, wherein the vehicle body surrounds a cavity, and wherein the at least one lifting device is connected at a top section of the cavity to lift a storage container from the three-dimensional grid and into the cavity, such that a bottom of the storage container is at a level above a lowest level of the second set of wheels.

10. The container-handling vehicle according to claim 1, wherein a cavity comprises a first vertical side section and a second vertical side section, the first and second vertical side sections being parallel and arranged on opposite sides of the cavity, and wherein the lifting shaft is arranged adjacent and parallel to the first vertical side section and the first pair of lifting bands extends in a substantially horizontal direction from the lifting shaft towards the second vertical side section.

11. The container-handling vehicle according to claim 1, comprising at least two adjacent lifting devices.

12. A storage system comprising: the three-dimensional grid and at least one container-handling vehicle according to claim 1, wherein the three-dimensional grid comprises multiple storage columns, in which the storage containers are stored on top of one another in vertical stacks, and wherein the at least one container-handling vehicle is operated on rails at a top level of the three-dimensional grid for retrieving the storage containers from, and storing the storage containers in, the multiple storage columns, and for transporting the storage containers horizontally across the three-dimensional grid.

* * * * *